US011030063B1

(12) United States Patent
Shipilov et al.

(10) Patent No.: US 11,030,063 B1
(45) Date of Patent: Jun. 8, 2021

(54) ENSURING DATA INTEGRITY DURING LARGE-SCALE DATA MIGRATION

(71) Applicant: Amazon Technologies, Inc., Seattle, WA (US)

(72) Inventors: George Shipilov, Seattle, WA (US); Kerry Quintin Lee, Seattle, WA (US); Matthew James Eddey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1116 days.

(21) Appl. No.: 14/673,839

(22) Filed: Mar. 30, 2015

(51) Int. Cl.
  *G06F 11/14* (2006.01)
  *G06F 11/07* (2006.01)
  *G06F 11/10* (2006.01)
  *G06F 11/20* (2006.01)

(52) U.S. Cl.
  CPC ...... *G06F 11/2064* (2013.01); *G06F 11/0718* (2013.01); *G06F 11/0727* (2013.01); *G06F 11/0787* (2013.01); *G06F 11/1004* (2013.01); *G06F 11/1435* (2013.01); *G06F 11/1484* (2013.01); *G06F 2201/815* (2013.01); *G06F 2201/84* (2013.01)

(58) Field of Classification Search
  None
  See application file for complete search history.

(56) References Cited

U.S. PATENT DOCUMENTS

| 5,623,481 | A | * | 4/1997 | Russ | H04J 3/14 370/225 |
| 7,127,507 | B1 | | 10/2006 | Clark et al. | |
| 7,995,574 | B2 | * | 8/2011 | Suri | H04L 45/00 370/389 |
| 8,799,206 | B2 | * | 8/2014 | D'Souza | G06F 11/1458 707/602 |
| 2006/0265455 | A1 | * | 11/2006 | Yakushev | G06F 9/546 709/206 |
| 2007/0079126 | A1 | * | 4/2007 | Hsu | G06F 21/64 713/176 |
| 2009/0287781 | A1 | | 11/2009 | Newcomb, Jr. | |
| 2010/0036861 | A1 | * | 2/2010 | Srihari | G06F 16/00 707/602 |
| 2010/0325500 | A1 | * | 12/2010 | Bashir | G06F 11/1612 714/746 |
| 2011/0145636 | A1 | * | 6/2011 | Schauser | G06F 11/0763 714/15 |
| 2011/0213928 | A1 | * | 9/2011 | Grube | G06F 11/1076 711/114 |

(Continued)

*Primary Examiner* — Irene Baker
(74) *Attorney, Agent, or Firm* — Davis Wright Tremaine LLP

(57) ABSTRACT

A system and method for maintaining data integrity during data transformation operations. The system and method include obtaining a message from a set of queues, obtaining, from a first data store, a data object indicated by the message, and generating, at a first host, a set of error detection codes corresponding to a transformation of the data object according to a transformation scheme. The system and method further include, transforming, at a second host different from the first host, the data object according to the transformation scheme into the transformation of the data object, verifying the transformation against the set of error detection codes, and storing the transformation in a second data store.

21 Claims, 12 Drawing Sheets

(56) References Cited

U.S. PATENT DOCUMENTS

| | | | |
|---|---|---|---|
| 2012/0265726 A1* | 10/2012 | Padmanabhan | G06F 17/303 707/602 |
| 2013/0138993 A1* | 5/2013 | Franklin | G06F 11/1048 714/2 |
| 2013/0275612 A1* | 10/2013 | Voss | H04L 65/60 709/231 |
| 2013/0326264 A1* | 12/2013 | Resch | G06F 11/1088 714/6.2 |
| 2014/0095522 A1* | 4/2014 | Fan | G06F 17/30557 707/756 |
| 2015/0058292 A1 | 2/2015 | Tu et al. | |
| 2016/0080244 A1* | 3/2016 | Retana | H04L 45/021 709/223 |
| 2016/0266801 A1* | 9/2016 | Marcelin Jemenez | G06F 3/0604 |
| 2017/0046199 A1 | 2/2017 | Kramer et al. | |

\* cited by examiner

ENSURING DATA INTEGRITY DURING LARGE-SCALE DATA MIGRATION

CROSS REFERENCE TO RELATED APPLICATION

This application incorporates by reference for all purposes the full disclosure of co-pending U.S. patent application Ser. No. 14/673,845, filed concurrently herewith, entitled "DEAD LETTER QUEUE FOR SMART FLEET MANAGEMENT."

BACKGROUND

As computing technology changes, legacy files and storage systems often need to be transferred and converted to new formats to take advantage of benefits of the new technology. When copying and transforming such legacy data, it is vital that data corruption be avoided. Error detection and correction information for verifying integrity of data, such as checksums, can be generated by a computing system performing the transformation, and for small amounts of data, the chance of data corrupted during transformation passing a verification check is remote. However, when large amounts of data are involved, the likelihood of data errors during a data copy and transformation, that would have otherwise been extremely improbable, increases.

BRIEF DESCRIPTION OF THE DRAWINGS

Various embodiments in accordance with the present disclosure will be described with reference to the drawings, in which.

DETAILED DESCRIPTION

Figure 1:
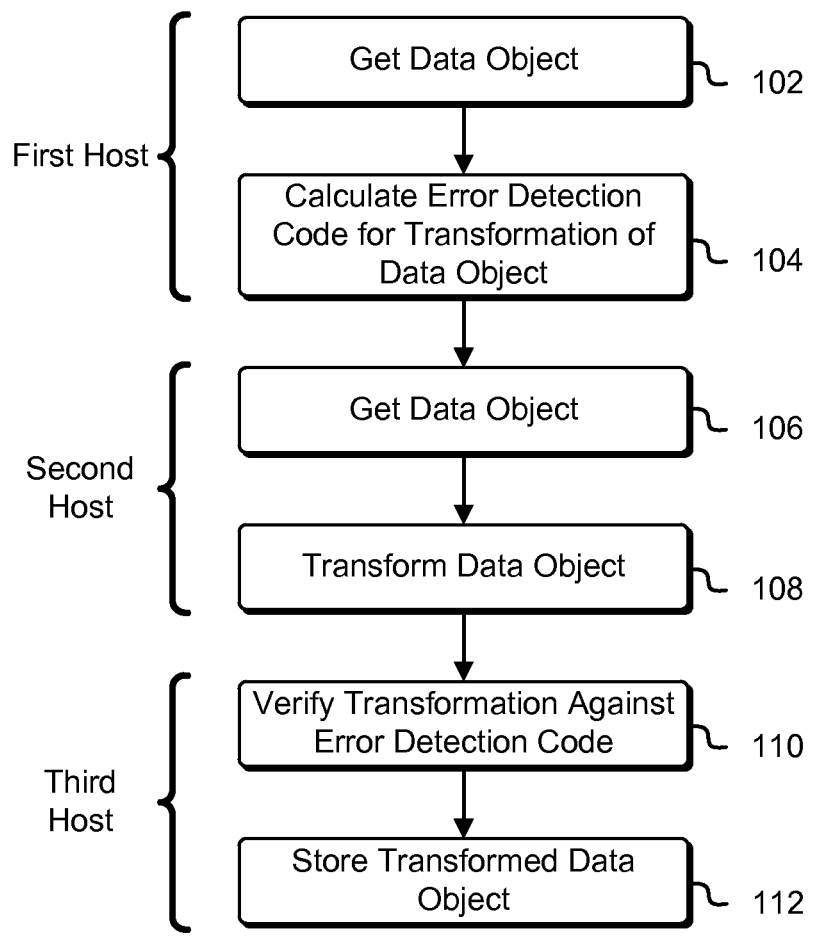
FIG. 1 illustrates an example of the transformation and migration phases of operation in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for transforming and migrating data. Embodiments of the present disclosure include a migrator that selects a set of data objects for transformation and migration. The operations are performed by host computers (also referred to as "hosts"), in a fleet of hosts, for example a plurality of host computers, physical or virtual, in a service provider environment. An example transformation and migration may be to split a large set of data objects from four-megabyte blocks into smaller 512-kilobyte blocks to be stored at a different storage location of a data storage service. Embodiments of the present disclosure allow such large sets to be transformed and migrated from one storage to another while minimizing or eliminating errors. The storage location of each data object may be indicated in a first message, and the first message then pushed to a first message queue of a set of queues by the migrator. Note that in some examples, a "system" may refer to a distributed system with one or more processors that may be distributed among multiple devices of the distributed system.

In a first phase, the first message may be delivered to a first host of a fleet of hosts performing the transformation and migration. The first message may be parsed by the first host to obtain the storage location of the data object. The first host may then make a request to the data storage service to receive the data object located at the storage location, providing, with the request, proof of credentials sufficient to authenticate to a policy management service that the first host is authorized to receive the data object.

Upon receipt of the data object located at the storage location, the first host may perform a transformation on the data object, such as by splitting a single object into multiple data objects. Note that techniques of the present disclosure can be adapted to implementations where multiple data objects are retrieved and transformed into fewer (e.g., one) data objects. Once the transformation is performed, the first host may generate a set of error detection codes (e.g., a checksum) for the transformed data, usable in verifying the integrity of the transformed data. Note that if the transformation results in the transformed data being multiple data objects, the set of error detection codes may be a set of codes, each corresponding to one of the multiple data objects. The first host may then discard the transformed data and append its host identifier (host ID) and the set of error detection codes to the first message to produce a second message, and the second message may then be pushed to a second message queue of a set of queues by the first host. The first message may then be removed from the first queue of the set of queues.

In a second phase, the second message may be delivered to a second host of the fleet of hosts performing the transformation and migration. The second message may be parsed by the second host to obtain the storage location of the data object and the host ID of the first host. In addition, in some circumstances, the set of error detection codes calculated by the first host may be passed as well. The second host may then make a request to the data storage service to receive the data object located at the storage location, providing, with the request, proof of credentials to sufficiently authenticate to a policy management service that the second host is authorized to receive the data object.

Upon receipt of the data object located at the storage location, the second host may first verify, by confirming that the host ID does not match the host ID of the second host, that the second host was not the first host that generated the set of error detection codes. Note that in some embodiments, the first host and second host belong to separate sub-fleets, and in such embodiment this verification may be omitted and the host ID may not be included in the second message. After this verification operation, the second host may perform the transformation on the data object as was performed by the first host during the first phase, and provide the transformed data of the second phase and the set of error detection codes generated in the first phase to the data storage service for storage.

Once received by the data storage service, the data storage service may generate a second set of error detection codes independent from the first set of error detection codes generated by the first host in the first phase. These two sets (i.e., the first set of error detection codes and the second set of error detection codes) may then be compared for verification purposes. If the two sets of error detection codes match, then successful verification of the transformed data against the set of error detection codes has occurred and the data storage service may store the transformed data. In addition, the data storage service may notify the second host and/or the migrator that transformation and migration was successfully performed. The second message may then be removed from the second queue of the set of queues.

By utilizing at least three hosts, such as the first host to determine the checksum, the second host to perform the transformation, and a third host (e.g., via the data storage service) to verify the checksum of the first host against the transformation of the second host (e.g., by generating another checksum from the transformation and comparing the other checksum with the checksum of the first host to determine whether the checksums match), the possibility that incorrect data will be stored will be dramatically reduced. That is, incorrect data would only be stored if the first host and the second host mis-transform the data in exactly the same way or if the first host and the third host mis-generate checksums in exactly the same way, which would be very unlikely. However, embodiments having only two hosts are also contemplated; for example, in such embodiments the second host may also generate the other checksum to be compared with the checksum generated by the first host in the first phase.

In some embodiments, messages that are not removed from the queue serve to indicate that the data transformation and migration of the corresponding data object or objects was unsuccessful. Messages in the queues that remain beyond an expiration time or beyond a threshold of delivery attempts may be moved by the queue to another queue for tracking unsuccessful transformation and migrations, such as a dead letter queue. In some examples, an "unprocessed work queue" may refer to this queue for tracking unsuccessful transformation and/or migrations. In these embodiments, the unprocessed work queue may be used to identify hosts of the fleet of hosts exhibiting hardware problems or may be used to identify communication pathways responsible for causing cause data errors. For example, if a host ID of a particular host appears with unexpected frequency in second messages (i.e., the messages read during the second phase) in the unprocessed work queue, it may indicate that the host associated with the host ID has a problem. In some of these embodiments, the hosts themselves read from the unprocessed work queue and if they detect that their own host ID appears with unexpected frequency (e.g., above a threshold, a certain proportion above the other hosts in the fleet, etc.), they may perform a remediation action on themselves. For example, such a host may throttle itself so that it performs fewer transactions or may drop itself from the fleet. In some embodiments, messages in the unprocessed work queue allow tracking of problems with the data object itself. For example, regardless of whether a message in the unprocessed work queue includes a host ID, the data object that is the subject of the message may be identified and tracked (e.g., by logging the occurrence of the particular data object into a log file or database) for later analysis.

The described and suggested techniques improve the field of computing, and specifically the field of data migration, by providing an efficient system for migrating large amounts of data while minimizing data errors. Additionally, the described and suggested techniques improve the functioning of computer systems by utilizing a queue for fleet host regulation. Moreover, the described and suggested techniques offer meaningful advantages over general error detection and mitigation schemes by separating data transformation from checksum generation and parallelizing operations, thereby improving migration speed while minimizing the possibility of error duplication caused by hardware associated with a single computing system.

FIG. 1 is a block diagram that illustrates an aspect of an embodiment 100 of the present disclosure. As illustrated in FIG. 1, the embodiment includes multiple hosts for performing transformation and/or migration of data. The operations in FIG. 1 may be categorized into separate phases of operation, but categorizing operations into separate phases is meant for illustration purposes only. In FIG. 1, a first host and a second host perform different operations of the transformation and migration. Although the processing may actually be performed by virtual hosts, in the embodiment depicted in FIG. 1, the operations performed by the first host may be performed (by either a physical or virtual computing system) using a separate physical computing system than the computing system performing the second host operations. In this manner, replication of errors caused by hardware of a computing system may be minimized between different phases of the operations.

Thus, for a data object that needs to be transformed and stored in its transformed format, in 102, a first host may retrieve the data object from its current storage location. In some embodiments, the storage location of the data object is obtained by the first host from a repository, such as a database or from a message queue of a set of queues. In 102, the data object may be transformed according to the predetermined transformation scheme (e.g., hashed, compressed, split, joined, encrypted, decrypted, etc.), and a set of error detection codes, such as one or more checksums, for verifying the transformation may be generated. It is contemplated that the operations of 102-04 may be performed by a single host or multiple hosts.

Also included in the operations of 104 may be for the first host to provide to the second host proof of the work it performed (e.g., or at least a portion of the actual work itself, such as the checksum) and notification that the next phase of operation may begin. For example, in some implementations, the first host places a message in a queue for the second host, with the message including the storage location of the data object, the set of error detection codes generated by the first host, and a host ID for the first host or virtual machine running on the first host as an indicator of which host generated the set of error detection codes. In some examples, the "host ID," which may also be referred to as a "hostname," may refer to an identifier, such as a string of alphabetic and/or numeric text characters, specifically assigned to the host that may be used to distinguish that host from other hosts. In some embodiments, the second host may not receive the set of error detection codes; e.g., the third host may obtain the set of error detection codes from another source (e.g., directly from the first host, from a message queue, from a fourth host, etc.) other than the second host. In other implementations, the first host provides the set of error detection codes directly to the second host without using a queue or set of queues.

The second host, thus notified that it may begin performing its operations on the data object, in 106 may retrieve the data object itself. In some implementations, the second host obtains the data object from the storage location indicated in the message the second host retrieved from the queue. In other implementations, the second host receives the set of error detection codes and/or the data object directly from the first host rather than from a queue or set of queues.

The second host, in 108, may transform the data object in the same manner as used by the first host, resulting in a transformation that should be verifiable with the set of error detection codes generated in 104 by the first host. The second host may provide the transformed data object and the set of error detection codes to a third host, which may be one or more physical and/or virtual hosts. In some embodiments, the third host is a computing system of a data storage service or some other third party host. In some implementations, the third host and the second host are the same host. In other implementations, the third host is a host for staging the verification and storage of the transformed data object. In still other implementations, the operations of 110 are performed by a third host and the operations of 112 are performed by a fourth host.

Upon receiving the transformation and the set of error detection codes, the third host may verify the transformation using the provided set of error detection codes and a second set of error detection codes that it generated. For example, the third host may be part of a storage service that generates a checksum for all storage operations. If the verification fails, the third host may notify the second host of the verification failure, and remediation actions may be taken, such as attempting to repeat the operations starting at 102 or 106, or performing troubleshooting actions to isolate the cause of the problem. The verification of the transformation may be used to ensure that errors did not occur during the transformation and migration. For example, if the data object was independently corrupted in a transfer to the first or second hosts, if the data object transformation is incorrect due to a memory error, if the error detection code generation is incorrect due to a bit flip, or if a different data object was somehow processed in 104 than 108, the verification should appropriately fail, thereby providing assurance of data integrity during the transformation and migration process.

If verification passes, in 112, the third host may store the transformed data object. After storage, the original data object may be deleted from its original storage location or archived as needed. Additionally, a database may be updated to indicate that the original data object was successfully transferred and migrated and/or the messages corresponding to the data object may be removed from the queues used in processes 101-08 to ensure that the data object is not unnecessarily reprocessed.

Figure 2:
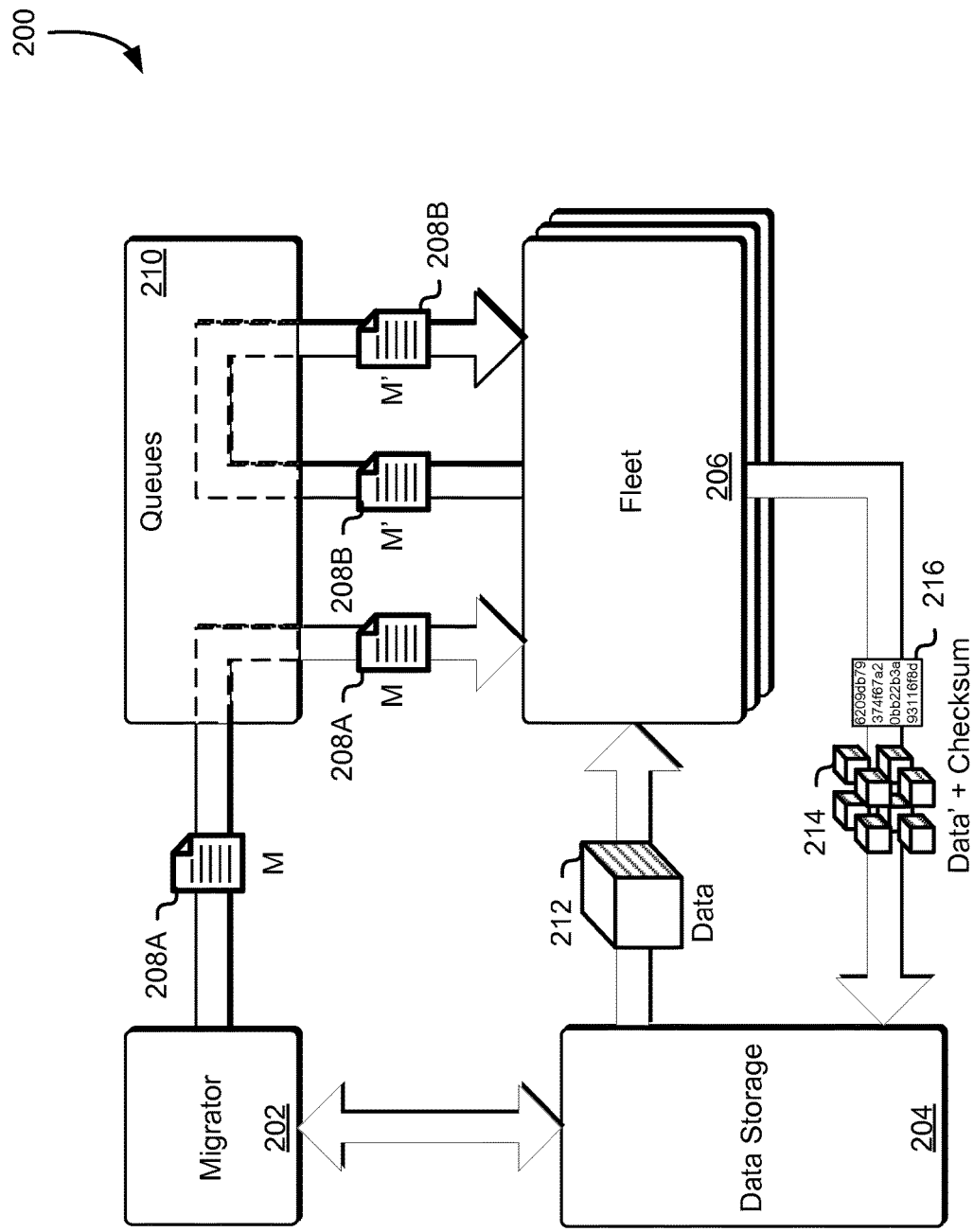
FIG. 2 illustrates an example of an environment for transforming and migrating data in accordance with an embodiment.

FIG. 2 illustrates an example embodiment 200 of the present disclosure. Specifically, FIG. 2 depicts a migrator 202 that determines which objects in data storage 204 are to be transformed by a fleet of hosts and migrated. For each data object 212 that needs to be transformed and migrated, the migrator 202 may generate a first message 208A and push the first message 208A to a queue. The first message 208A may be generated to contain metadata about the data object 212 (such as a uniform resource identifier (URI) indicating the storage location of the data object 212 within the data storage 204). The fleet of host 206 may retrieve the first message 208A from the queue 210 for use in transforming the data object 212. Note that all components of the embodiment 200 may be part of the same computing resource service provider network.

Data (e.g., files, database records, etc.) stored in the data storage 204 may be comprised of a set of data objects. The migrator 202 may be a collection of computing resources provided of a computing resource service provider configured to query the data storage 204 for data objects to migrate. The migrator 202 may also be configured to handle migration-related application programming interface requests. The migrator 202 may be configured to throttle the migration flow as needed; for example, to ensure that the number of concurrent migrations do not exceed a threshold. In some embodiments, the migrator 202 is configured to delete legacy data objects once they have been migrated. In other embodiments, legacy data objects will be deleted by a separate garbage collection process. In some examples, "throttling" may refer to regulating a rate at which processing of transformation and/or migrations transactions are performed at the host.

In the present disclosure, the set of queues 210 may serve as a staging area for migration jobs. That is, the migrator 202 may determine which data objects need to be migrated, and, for each data object to be migrated, delivers a message indicating a data storage location in the data storage 204 for the respective data object to the queue 210. In some embodiments, the queues in the set of queues 210 are separate messaging queues of a messaging service. In some of these embodiments, messages may not be removed from the queue until the messaging service has received notification from the requestor that message delivery was successful.

In an illustrative example, data stored with a data storage service of a computing resource service provider has been stored as 50 billion sets of four-megabyte data objects. In this example, it is determined to by the computing resource service provider to change the file storage format of the data storage service to store data as sets of 512-kilobyte data objects. Therefore, the legacy sets of four-megabyte data objects will need to be converted/split into eight 512-kilobyte data objects, which will require creating and copying 400 billion sets of 512-kilobyte data objects. In this example, where the data storage 204 is configured to store data in four-megabyte blocks, a 12-megabyte file may be stored as a set of three four-megabyte data objects. Each of the set of associated data objects of a particular piece of data may or may not be stored sequentially or contiguously. Thus, when transforming and/or migrating a particular piece of data (e.g., a file), a "manifest" may be generated that contains the storage locations of each of the data objects corresponding to that piece of data. In some embodiments, a separate first message 208A is generated for each data object listed in the manifest. In other implementations, each first message 208A includes the entire manifest and may contain storage locations for one or more data objects.

In some cases, if the data object 212 of a set of data objects in a manifest fails transformation and migration (e.g., the data storage 204 is unable to validate the integrity of the transformed data 214 with the set of error detection codes 216), it may be desirable to re-process all data objects in the manifest (deleting transformed data associated with such data objects that were successfully migrated). Reprocessing all data objects in this case may be desirable, for example, in order to minimize data fragmentation (e.g., storing data objects associated with a file non-contiguously) at the data storage 204.

The data storage 204 may be a collection of computing resources provided by a computing resource service provider configured to synchronously process requests to store and/or access data. The data storage 204 may operate using computing resources (e.g., databases) that enable the data storage 204 to locate and retrieve data quickly, and allow data to be provided in responses to requests for the data. For example, the data storage 204 may maintain stored data in a manner such that, when a request for a data object is retrieved, the data object can be provided (or streaming of the data object can be initiated) in a response to the request. As noted, data stored in the data storage 204 may be organized into data objects, similar to the data object 212. The data objects may have arbitrary sizes except, perhaps, for certain constraints on size. Thus, the data storage 204 may store numerous data objects of varying sizes. The data storage 204 may operate as a key value store that associates data objects with identifiers of the data objects which may be used by customers of the computing resource service provider to retrieve or perform other operations in connection with the data objects stored by the data storage 204.

As another example, the data storage 204 may be configured to store data for a customer of a computing resource service provider using block-level storage devices (and/or virtualizations thereof). The block-level storage devices may be operationally attached to virtual computer systems provided by a virtual computer system service of the computing resource service provider to serve as logical units (e.g., virtual drives) for the virtual computer systems. A block-level storage device may enable the persistent storage of data used/generated by a corresponding virtual computer system where the virtual computer system service may only provide ephemeral data storage. As still another example, the data storage 204 may be a database service of a computing resource service provider configured to operate one or more databases for a customer of the computing resource service provider. In yet another example, the data storage 204 may be an object-level archival data storage service.

The data object 212 may be at least one data object of a set of data objects to be transformed and migrated. For example, the data object 212 may be a single data object to be transformed (e.g., split) into multiple data objects comprising the transformed data 214. As another example, the data object 212 may be a single data object to be transformed (e.g., compressed, encrypted, hashed, etc.) into a single object of transformed data 214. As noted, techniques of the present disclosure may be adapted to implementations where multiple data objects are retrieved and transformed into fewer data objects. For example, the element depicted as the data object 212 in such an implementation may be a set of multiple data objects to be combined into a single object of transformed data 214. Thus, transformed data 214 may be a set of one or more data objects produced by transforming the data object 212, which itself may be a set of one or more data objects.

The first message 208A may be metadata about the data object 212. For example, the first message 208A may include information indicating a location within the data storage 204 corresponding to the data object 212 targeted for migration. Examples of other types of metadata that may be included in the first message 208A include, message identifier (message ID) of the message, a timestamp indicating when the data object was stored or last modified, a timestamp indicating when the message was placed in the queue, a count of delivery attempts for the message, permissions associated with the data object, identity of a host pushing the message to the queue, or size of the data object. The first message 208A therefore may be retrieved by the fleet of hosts 206 in order to request the data object 212 from the data storage 204, with reference to the storage location obtained from the first message 208A.

The fleet of hosts 206 may be a collection of physical or virtual computing resources configured to transform data objects, such as the data object 212 received from the data storage 204, into transformed data 214 and generate a checksum for the transformed data. Hosts of the fleet of hosts 206 may retrieve the first message 208A, determine the location of the data object 212 from the first message 208A, and request and receive the data object 212 from the data storage 204. Any number of hosts may be in the fleet of hosts 206 (e.g., 100,000 hosts). In some embodiments, each host in the fleet of hosts 206 are interchangeable (i.e., performs the same operations) with other hosts of the fleet of hosts 206. In other embodiments, there are multiple fleets (i.e., sub-fleets) in the fleet of hosts 206, and hosts in one fleet/sub-fleet may perform different operations than hosts in a different fleet/sub-fleet.

If transformation of one or more data objects into one or more transformed data objects and generation of a set of error detection codes for the one or more transformed data objects is performed using a single host, a possibility exists that an error could be introduced in the transformation and migration process. For example, the data could have become corrupted during the process of reading the data object from its source, the data could have become corrupted during the transformation due to a memory error of the single host, etc. Therefore, it is contemplated in the present disclosure to utilize a first host to provide a set of error detection codes to be used as a sanity check for the transformation by a second host in order to minimize the possibility of an error occurring during the migration process. In embodiments of the present disclosure, a transformation is performed independently by two different hosts, with a first host computing a checksum of the resulting transformation and a second host providing the transformation. In some embodiments, a third host then verifies the checksum of the first host against the transformation of the second host to determine whether the transformation and transfer was successful. For example, the third host may generate its own checksum for the transformation of the second host and compare its checksum with the checksum of the first host to see if they match. Note, in some examples, "host" may refer to a physical or virtual computing system. In embodiments of the present disclosure, the first host and the second host are separate physical computing systems or are each virtual machines executing on separate physical machines. It is contemplated as within the scope of the present disclosure that the first host and the second host may be separate virtual machines running on the same physical computing system. It is further contemplated that in some implementations, the second host can perform the verification and the storage without recourse to a third host.

The fleet of hosts 206 may also be configured to transform the data object 212 into the transformed data 214, according to the predetermined method of transformation. The data object 212 may be also received by hosts of the fleet of hosts 206 in compressed format, and the transformation may first entail decompressing the compressed data object before further transforming the data object 212. For example, the fleet of hosts 206 may be configured to receive the data object 212 as a four-megabyte data object (when decompressed) and split the data object 212 into a set of eight 512-kilobyte data objects. In performing this transformation, the data object 212 may be decompressed and then each 512-kilobyte section of data of the four-megabyte data object read into a separate buffer. A checksum may be generated for each of the 512-kilobytes of data, illustrated as set of error detection codes 216 (e.g., set of checksums). As another example, the fleet of hosts 206 may be configured to receive the data object 212 as a set of 512 kilobyte data objects, and combine the set of data objects into a single data object. As still another example, the fleet of hosts 206 may be configured to receive the data object 212 in uncompressed form and compress the data object into the transformed data 214. In another example, the fleet of hosts 206 may be configured to receive the data object 212 as data encrypted with a cryptographic key, decrypt the data object 212, and re-encrypt the unencrypted data object 212 into the transformed data 214 using a different cryptographic key.

The fleet of hosts 206 may also be configured to generate the set of error detection codes 216 (e.g., cyclic redundancy check, hash value, or other checksum or verification information) for verifying the integrity of the transformed data 214. In the example where the fleet of hosts 206 splits a four-megabyte data object into a set of eight 512-kilobyte data objects, the fleet of hosts may generate a checksum for each of the eight 512-kilobyte data objects, with each checksum usable to verify the integrity of its corresponding 512-kilobyte data object.

The second message 208B may be a message corresponding to the data object 212 and/or corresponding to the transformed data 214 pushed to the set of queues 210 from a host of the fleet of hosts 206. The second message 208B may include metadata about the data object 212 and/or the transformed data 214 usable in another phase of the data transformation operations. For example, the second message 208B may be a message that includes the first message 208A as well as the set of error detection codes 216, such as a set of checksums, for the transformed data 214 and a host ID corresponding to the host of the fleet of hosts 206 that generated the checksum.

The set of queues 210 may be a collection of computing resources configured to enable computing resources of a computing resource service provider to store one or more messages in queues for use by other computing resources of the computing resource service provider, such as a queue service. Examples of such a queue service include RabbitMQ, Java Message Service, and Microsoft Message Queuing. Such queue service may be a queue service that utilizes Advanced Message Queuing Protocol (AMQP). In other implementations, the set of queues 210 may be one or more records in a database table, one or more arrays, one or more circular buffers, one or more linked lists, one or more stacks, or one or more similar data structures. Each message provided to the set of queues 210 may comprise any variation of text, such as programming code, URIs for data objects and other statements. In some embodiments, the set of queues 210 implements an unprocessed work queue, similar to the unprocessed work queue 522 of FIG. 5, where messages from other queues that were not successfully delivered may be delivered. In various embodiments, the present disclosure utilizes a single queue, multiple queues, or one or more queues and at least one unprocessed work queue.

Thus, in a first phase, a first host of the fleet of hosts 206 may retrieve the first message 208A, parse the first message 208A to obtain a storage location of the data object 212 to be migrated, and request and receive the data object 212 at that storage location from the data storage 204. Still during the first phase, the first host may transform the data object 212 into the transformed data 214 and generate the set of error detection codes 216 (e.g., checksum) for the transformed data 214. It is contemplated that in some implementations of the present disclosure, that the set of error detection codes 216 are able to be generated without completely transforming the data object 212. In such a case, the first host may only perform such steps as necessary to generate the set of error detection codes 216 for the data object 212 that will be transformed in the second phase below. The first host may then generate the second message 208B by appending its host ID (identifier uniquely identifying/distinguishing the host from all other hosts in the fleet) to the first message 208A, as well as appending the set of error detection codes 216 to the first message 208A. The first host may then push the second message 208B to the same or different queue of the set of queues 210 and cause the first message 208A to be deleted or removed from its respective queue. In some cases, where the set of queues 210 is a queue service, the first message 208A may be caused to be deleted or removed by notifying the queue service that the first message 208A was successfully delivered.

In a second phase, a second host may retrieve the second message 208B, parse the second message 208B to obtain the storage location of the data object 212 to be migrated, and request and receive the data object 212 at that storage location from the data storage 204. As a part of the second phase, the second host may read the host ID from the second message 208B to confirm that the host ID of the second host does not match the host ID in the second message 208B. If the host ID of the second host does match the host ID of the second message 208B, the second host may ignore that message and grab the next message in the queue as the second message 208B. It is contemplated as within the scope of the present disclosure that the second message 208B need not include a host ID of the host that generated the set of error detection codes 216. However, including the host ID provides at least one way of ensuring that the operations performed on the data object 212 during the second phase are performed by a different host than the host that performed the operations on the data object 212 during the first phase. This, for example, eliminates the chances that the same host generated the initial error detection codes as performed the transformation, thereby eliminating the possibility that the checksum is verified even though the data transformation was erroneous (e.g., such as in a case where the host correctly generates error detection codes for incorrectly transformed data). By having two separate hosts perform the error detection and transformation, one can ensure greater reliability that the transformation was without error when the checksums can be verified.

Still during the second phase, the second host may transform the data object 212 into the transformed data 214. Note that in the second phase, a set of error detection codes for the transformed data 214 is not necessarily generated by the second host. Instead, the set of error detection codes 216 generated during the first phase may be read from the second message 208B, and the second host may provide the set of error detection codes 216 and the transformed data 214 back to the data storage 204 (or a different data storage) for verification and storage. In some embodiments, the transformed data 214 and/or the set of error detection codes are pushed to a third queue (e.g., a staging queue), rather than being provided directly to the data storage 204. Verification of the transformed data 214 by the data storage 204 using the set of error detection codes 216 may operate to verify that the transformed data was not corrupted between the transfer of the transformed data from the second host to the data storage 204, and may also operate to verify that the first host and the second host agree on the transformation.

Once the transformed data 214 is verified and stored, the data storage 204 may update references to the data object 212 to refer to the stored transformed data instead. In some implementations, upon successful verification and storage of the transformed data 214, the data storage 204 deletes the data object 212 from its data stores. In other implementations, the second host will notify the migrator 202 of successful verification and storage of the transformed data 214. In such implementations, upon determination by the migrator 202 that all data objects corresponding to a particular manifest have been successfully transformed and migrated, the migrator 202 may notify the data storage 204 that the legacy data objects associated with the manifest may be deleted from the data stores of the data storage 204.

Note that embodiments of the present disclosure may also be applicable to transformation of data without migration of the data. For example, where a goal is to compress a data object but retain it in its current data store, a first host may generate a checksum for the compressed data object while a second host may compress the data object. Upon verification of the compressed data object with the checksum, the compressed data object may be stored in the data store to replace the uncompressed data object. Similarly, embodiments of the present disclosure may be utilized for migration without transformation of data. For example, a first host may generate a checksum for a data object while a second host provides the data object and the checksum to a third host. Upon verification of the data object with the checksum, the third host may store the data object at a new storage location, and the data object may be cleaned/deleted from its original storage location.

Note too that in some embodiments, any of the hosts of the fleet of hosts 206 perform the operations of both the first host and the second host described above. For example, each host of the fleet of hosts may be configured to alternate between performing the operations of the first host described above and performing the operations of the second host described above. In other embodiments, there are at least two separate fleets; that is, hosts of a first fleet may be configured to perform the operations of the first host described above, and hosts of a second fleet may be configured to perform the operations of the second host described above.

In some implementations, the data storage 204 is configured to, upon receiving transformed data 214 with the set of error detection codes 216, verify/validate the transformed data 214 against the set of error detection codes 216. The data storage 204, in some embodiments, may perform the verification/validation by generating its own set of error detection codes as a verification set of error detection codes and comparing the verification set against a reference set of error detection codes (i.e., the set of error detection codes 216) provided to the data storage 204, with successful verification/validation depending on whether the verification and the reference sets match. The data storage 204 may notify the sender of the data whether the verification was successful. In some cases, the data storage 204 may also output to the sender the data storage location of the transformed data 214. For example, if the transformed data 214 comprised multiple data objects (e.g., transformation splitting the data object 212 into eight data objects), the data storage 204 may provide the storage location (such as an URI) of each of the multiple data objects. In some implementations, where the transformed data 214 comprises multiple data objects, failure to verify one of the multiple data objects causes the data storage 204 to reject all of the multiple data objects. In other implementations, failure to verify one of the multiple data objects results in the data storage 204 only rejecting to store the failed data object of the transformed data 214. In some of these implementations, the data object 212 may be re-processed, and, for efficiency, only the rejected data object of the transformed data 214 (and its corresponding checksum) may be re-sent to the data storage 204 for storage.

Thus, in embodiments of the present disclosure, upon receiving an indication from the data storage 204 that the transformed data 214 was successfully verified, the second host may cause the second message 208B from to be deleted or removed from its respective queue. In some cases, where the set of queues 210 is a queue service, the second message 208B may be caused to be deleted or removed by notifying the queue service that the second message 208B was successfully delivered. Note that each host of the fleet of hosts 206 may be performing the operations of the first phase or the second phase in parallel with the other hosts of the fleet of hosts 206.

Unsuccessful verification of the transformed data 214 against the set of error detection codes 216 may occur for a variety of reasons. In one scenario, the first or second host may have experienced a bit error or other error when performing the transformation of the data object 212. In another scenario, the first host may have experienced an error during the generation of the set of error detection codes 216. In still another scenario, an error may have occurred in the transmission of the data object 212 from the data storage 204 to the first or second host (e.g., the network interface controller has a defective receive queue, a computing system of the data storage 204 has a defective transmit queue, signal noise on the transmission line affected the data, the first or second host used credentials incorrect or insufficient to access the data object 212, etc.). In yet another scenario, either the transformed data 214 or the set of error detection codes 216 may have experienced an error in the transmission from the second host to the data storage 204. In even another scenario, an error may have occurred with the set of error detection codes 216 during appending it to the second message 208B by the first host, pushing the second message 208B to the set of queues 210, receiving the second message 208B from the set of queues 210, or reading the set of error detection codes 216 from the second message 208B by the second host. In these cases, verification failure serves to reduce the probability of data being lost during the transformation of the data object 212 to the transformed data 214.

Figure 3:
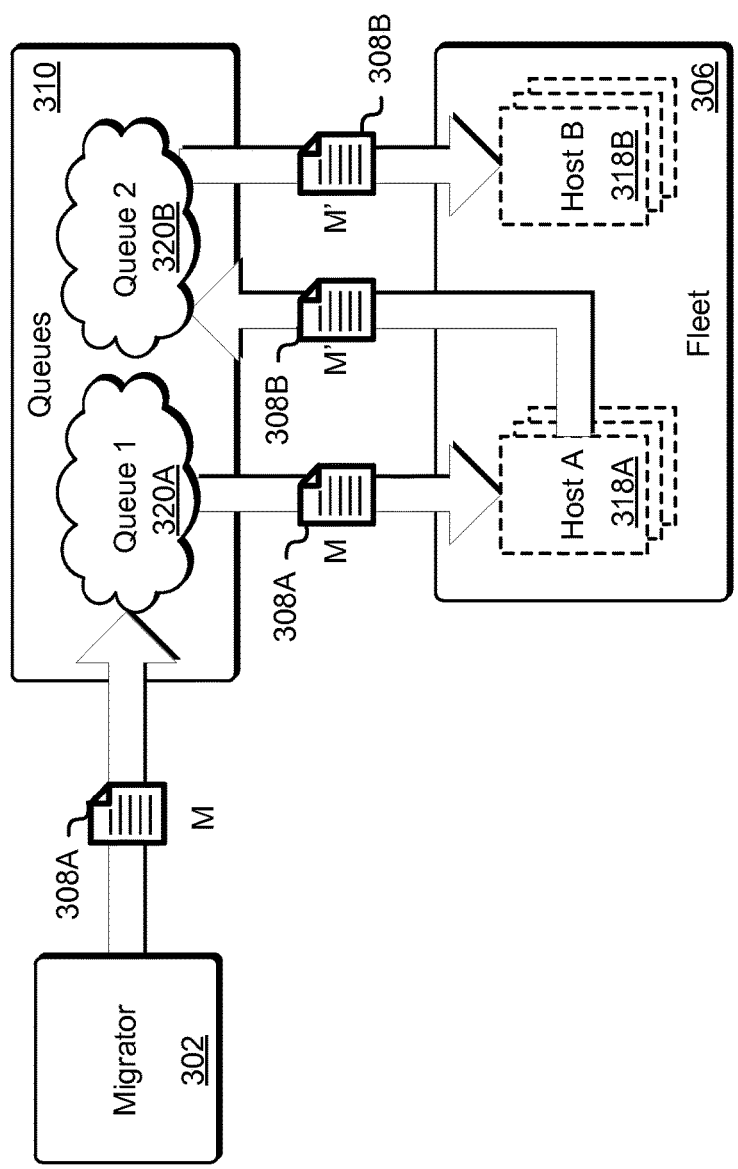
FIG. 3 illustrates an example of using multiple queues in accordance with an embodiment.

FIG. 3 illustrates an example embodiment 300 of the present disclosure/etc. Specifically, FIG. 3 depicts a migrator 302 that pushes a first message 308A that indicates a storage location of a data object to a first queue 320A of a set of queues 310. In a first phase of operation, a first host 318A of a fleet of hosts 306 retrieves the first message 308A and pre-processes the data object corresponding to the first message 308A by generating a set of error detection codes, and pushes a second message 308B to a second queue 320B of the set of queues 310, the second message including the storage location of the data object, the set of error detection codes, and a host ID of the first host 318A. In a second phase of operation, a second host 318B retrieves the second message 308B and performs the final processing; that is, the second host 318B transforms the data object indicated by the storage location included in the second message 308B.

Although FIG. 3 illustrates an embodiment of the present disclosure having two queues, it is contemplated that there may be any number of queues in use by the fleet of hosts 306 as needed. For example, there may be a set of queues and hosts of the fleet of hosts 306 may be configured to receive messages from and deliver messages to queues of the set of queues in a random or round-robin fashion. As still another example, a transformation may be broken into more than two phases of operation and may use more than two queues to accommodate the phases. Using, as an example, the situation where a four-megabyte data object is being split into eight 512-kilobyte data objects, the first host 318A may split the data object into eight parts, generate a checksum for each part, and distribute messages corresponding to the checksum of each part among eight queues. That is, after splitting and generating the checksums, the first host 318A may push a first checksum message to a first checksum queue, a second checksum message to a second checksum queue, and so on until the eighth checksum message is pushed to the eighth checksum queue. Thereafter, the second host 318B may be configured to retrieve the checksum messages from their respective queues according to any of a variety of schemes (e.g., round-robin, randomly, a separate fleet of hosts assigned to each checksum queue, etc.). In this example, the second host 318B may be configured to only perform the portion of the transformation associated with the particular message. That is, if a second host 318B retrieves a fourth checksum message from a fourth checksum queue, the second host may be configured to only perform the transformation that produces the fourth split of the four-megabyte data object and only provide that fourth split and set of error detection codes to the data storage.

As another example, a first host 318A may receive a compressed, encrypted data object corresponding to a data location in the first message 308A received from the first queue 320A, decompress the encrypted data object, and push the second message 308B including a first checksum for the decompressed encrypted data object to the second queue 320B. A second host may retrieve the second message 308B, obtain the compressed encrypted data object, decompress and verify the encrypted data object against the checksum from the second message 308B, decrypt the decompressed data object using a first key and re-encrypt the decompressed data object using a second key, and push a third message including a second checksum for the re-encrypted data object to a third queue. A third host may retrieve the third message, obtain the compressed encrypted data object, decompress the encrypted data object, decrypt and re-encrypt the data object, and provide the re-encrypted data object and the second checksum to the data storage service. Hence, as this example illustrates, there may be any number of transformation operations, hosts, and queues implemented in the system of the present disclosure. Note that an advantage of having more than one queue may be that multiple queues may be implemented so that multiple hosts may perform different aspects/phases of operations in parallel, thereby reducing processing delay; i.e., after a phase of operations is complete, the message needed to begin the next phase of operations may not need to be pushed to the end of a long single queue.

The hosts 318A-18B of the fleet of hosts 306 may be one or more virtual machine instances executing on physical hosts. The hosts 318A-18B may be configured to communicate credentials to a policy management service for authentication for requesting data objects from a data store and for sending transformed data objects to the same or different data store. As described, the first host 318A may be a physical or virtual computing system configured to perform a transformation of a data object and compute a checksum of the resulting transformation. In a first phase of operations, the first host 318A of the fleet of hosts 306 may retrieve the first message 308A from the first queue 320A, parse the first message 308A to obtain a storage location of the data object to be migrated, and request and receive the data object. The first host 318A may then transform the data object and generate the set of error detection codes for the transformed data. The first host 318A may then generate the second message 308B by appending its host ID to the first message 308A, as well as appending the set of error detection codes to at least a portion of the first message 308A indicating the storage location of the data object. The first host 318A may then push the second message 308B to the second queue 320B and cause the first message 308A to be deleted/removed from its respective queue. In embodiments where the set of queues 310 are queues of a queue service, the queue service may be configured to delete/remove the first message 308A from its respective queue upon notification that the first message 308A was successfully delivered.

In a second phase, a second host 318B may retrieve the second message 308B from the second queue 320B, parse the second message 308B to obtain the storage location of the data object to be migrated, and request and receive the data object. As noted, in some embodiments, the first host 318A and the second host 318B are part of the same fleet of hosts 306 and may be interchangeably performing first phase and second phase operations. Therefore, as a part of the second phase, the second host 318B may read the host ID from the second message 308B to confirm that the host ID of the second host 318B does not match the host ID in the second message 308B (i.e., the host ID of the first host/host that generated the set of error detection codes). If the host ID of the second host 318B does match the host ID of the first host 318A, the second host 318B may ignore that message and grab the next message in the second queue 320B as the second message 308B.

Still during the second phase, the second host 318B may transform the data object. The set of error detection codes generated by the first host 318A may be read from the second message 308B, and the second host 318B may provide the read set of error detection codes and the transformed data back to a data store for verification and storage. Verification of the transformed data using the set of error detection codes may operate to verify that the transformed data was not corrupted between the transfer of the transformed data from the second host 318B to the data store, and may also operate to verify that the first host 318A and the second host 318B agree on the transformation.

The migrator 302 may be a collection of computing resources provided from a computing resource service provider configured to determine which data objects to transform and migrate, similar to the migrator 202 described in conjunction with FIG. 2. The fleet of hosts 306 may be a collection of physical or virtual computing resources configured to transform and migrate data objects, similar to the fleet of hosts 206 described in conjunction with FIG. 2. The first message 308A may include metadata, usable in a first phase of operations, about the data object to be transformed, similar to the first message 208A described in conjunction with FIG. 2, and pushed to the first queue 320A by the migrator 302. The second message 308B may be another message corresponding to the data object and/or the transformed data, pushed to the second queue 320B by the first host 318A, similar to the second message 208B. The second message 308B may include metadata, at least some of which may be metadata obtained by the second host 318B from the first message 308A, about the data object and/or the transformed data usable in a second phase of the operations.

As noted, in some embodiments, the first host 318A and the second host 318B are all hosts of the same fleet (e.g., the fleet of hosts 306) and each may be configured to read messages from either queue and perform the appropriate (e.g., first phase or second phase) operations as needed. In other embodiments, the first host 318A belong to a separate fleet than the second host 318B. For example, the hosts in the fleet of the first host 318A may be configured to perform operations of the first phase and hosts in the fleet the second host 318B may be configured to perform operations of the second phase. Note that in embodiments having separate fleets that perform different operations, the first host 318A may not include its host ID in the second message 308B. In such embodiments, since a separate fleet of hosts will be reading the second message 308B from the second queue 320B and therefore a host performing the transformation in the second phase of operations (e.g., the second host 318B) will be assured not to transform a data object for which it generated the set of error detection codes. Alternatively, in these embodiments, the first host 318A may still include its host ID with the second message 308B for tracking and/or troubleshooting purposes. For example, if a transformation by the second host 318B is unable to be verified against a set of error detection codes in the second message 308B because the set of error detection codes is bad, it may be useful to have a host ID to determine which host generated the bad set of error detection codes so that host may be investigated, throttled, or removed from the fleet).

The first queue 320A and the second queue 320B may be separate messaging queues of a messaging service, or may be any other data structure suitable to store messages for the hosts of the present disclosure. The set of queues 310 may be a collection of computing resources configured to store and deliver one or more messages in queues, such as the first queue 320A and the second queue 320B, similar to the set of queues 210 described in conjunction with FIG. 2. Each message provided to the set of queues 310 may comprise any variation of text, such as programming code, URIs for data objects and other statements. In some embodiments, the set of queues 310 implements an unprocessed work queue, similar to the unprocessed work queue 522 of FIG. 5, where messages from other queues that were not successfully delivered may be routed.

Figure 4:
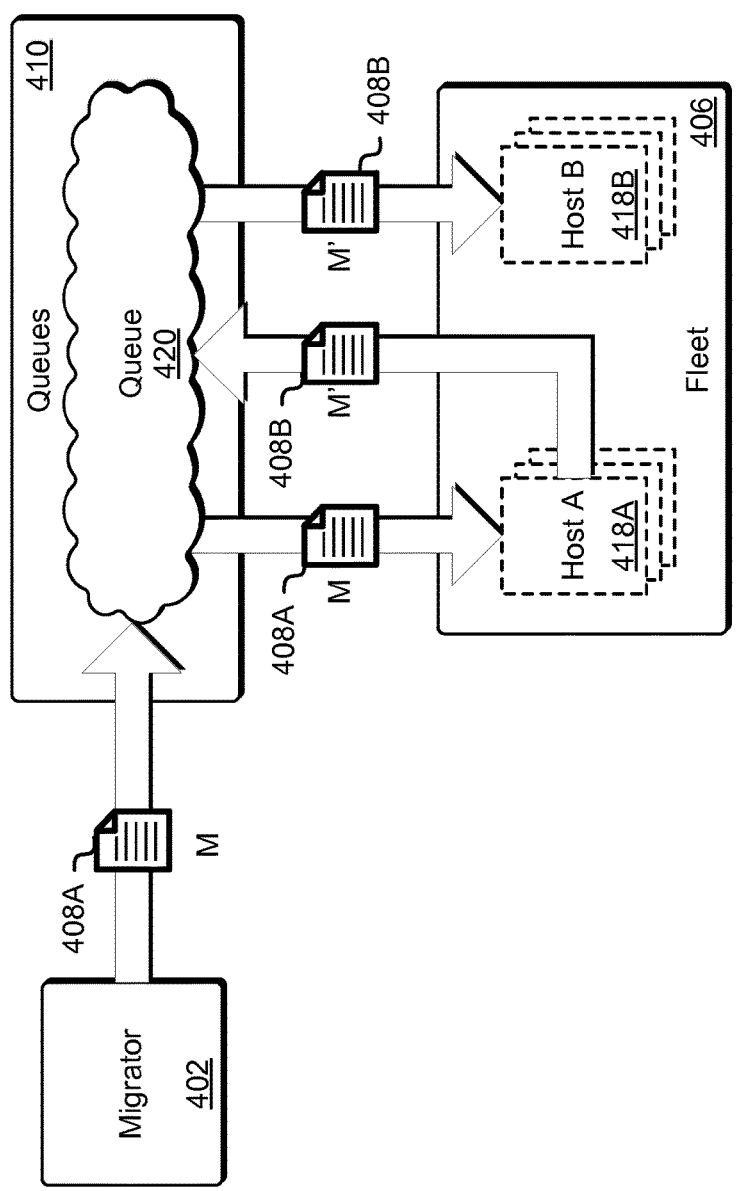
FIG. 4 illustrates an example of using a single queue in accordance with an embodiment.

FIG. 4 illustrates an example embodiment 400 of the present disclosure. Specifically, FIG. 4 depicts a migrator 402 that pushes a first message 308A that indicates a storage location of a data object to a single queue 420 of a set of queues 410. In a first phase of operation, a first host 418A of a fleet of hosts 406 retrieves a message from the single queue 420 and determines it to be the first message 408A. The first host 418A pre-processes the data object corresponding to the first message 408A by generating a set of error detection codes, and pushes a second message 408B to the single queue 420, the second message including the storage location of the data object, the set of error detection codes, and a host ID of the first host 418A. In a second phase of operation, a second host 418 retrieves a message from the single queue 420 and determines it to be the second message 408B. The second host 418B performs the final processing on the data object based on the second message 408B; that is, the second host 418B transforms the data object indicated by the storage location included in the second message 408B.

In some embodiments, the first message 408A and the second message 408B are marked, tagged, or formatted in such a way that they can be distinguished from each other. For example, the first message 408A may be distinguished from the second message 408B because first message 408A may not include a host ID while the second message 408B does include a host ID. In some implementations, whether the host receiving the message performs the operation of the first phase (i.e., the error detection code phase) or the operations of the second phase (i.e., the transformation phase) is based at least in part on the type of message received. For example, if the message received by the host from the single queue 420 includes a host ID and/or error correction code, then the message may be recognized as the second message 408B and the host performs the operations of the second phase on the second message 408B. Likewise, if the message received by the host from the single queue 420 does not include a host ID and/or error correction code, then the message may be recognized as the first message 408A and the host performs the operations of the first phase on the first message 408A.

Alternatively, a host may alternate performing the first phase operation and performing the second phase operation. For example, if the host last performed first phase operations, the host may retrieve a message from the single queue 420 and, if the message does not include a host ID and/or error correction code, the host may ignore that message and request the next message in the single queue 420 until a second phase message (e.g., the second message 408B), is retrieved. Conversely, if the host last performed a second phase operation, the host may retrieve a message from the single queue 420 and, if the message does include a host ID and/or error correction code, the host may ignore that message and request the next message in the single queue 420 until a first phase message (e.g., the first message 408A), is retrieved. In this way, the hosts may be configured to achieve a relatively equal work balance as each host should perform approximately the same number of first phase operations as second phase operations.

As still another approach, each of the hosts performing first phase operations may belong to a different fleet than the hosts performing the second phase operations. In this approach, the first host 418A is only configured to perform first phase operations while the second host 418B is only configured to perform second phase operations, and any messages received by a host from the single queue 420 that do not correspond to the designated operational phase are ignored. As noted, the set of queues 410 may be a queue service configured to retain messages until notified that the message has been successfully delivered/processed. Thus, if a host ignores a message, the message remains in the single queue 420 to be picked up by a different host.

The migrator 402 may be a collection of computing resources provided from a computing resource service provider configured to determine which data objects to transform and migrate, similar to the migrator 202 described in conjunction with FIG. 2. The fleet of hosts 406 may be a collection of physical or virtual computing resources configured to transform and migrate data objects, similar to the fleet of hosts 206 described in conjunction with FIG. 2. The first message 408A may include metadata, usable in a first phase of operations, about the data object to be transformed, similar to the first message 208A described in conjunction with FIG. 2, and pushed to the single queue 320 by the migrator 402. The second message 408B may be another message corresponding to the data object and/or the transformed data, pushed to the single queue 420 by the first host 418A, similar to the second message 208B. The second message 408B may include metadata, at least some of which may be metadata obtained by the second host 418B from the first message 408A, about the data object and/or the transformed data usable in a second phase of the operations.

The hosts 418A-18B of the fleet of hosts 406 may be one or more virtual machine instances executing on physical hosts, similar to the hosts 318A-18B described in conjunction with FIG. 3. The single queue 420 may be a messaging queue of a messaging service, such as the set of queues 410. The set of queues 410 may be a collection of computing resources configured to store and deliver one or more messages in queues, such as the single queue 420, similar to the set of queues 210 described in conjunction with FIG. 2. Each message provided to the set of queues 410 may comprise any variation of text, such as programming code, URIs for data objects and other statements. In some embodiments, the set of queues 410 implements an unprocessed work queue, similar to the unprocessed work queue 522 of FIG. 5, where messages from other queues that were not successfully delivered may be routed.

Figure 5:
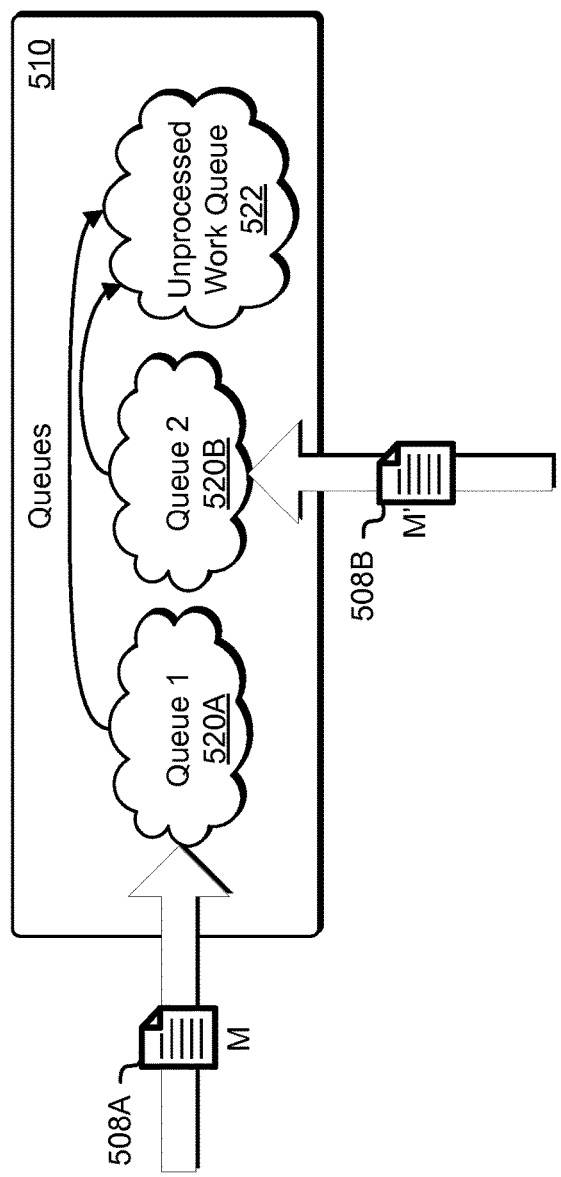
FIG. 5 illustrates an example of an unprocessed work queue in accordance with an embodiment.

FIG. 5 illustrates an aspect of an environment 500 in which an embodiment may be practiced. Specifically, FIG. 5 depicts usage of an unprocessed work queue 522 for tracking possible errors with hosts or data objects, such as a dead letter queue, in an embodiment of the present disclosure. The environment 500 may include a set of queues 510 having a first queue 520A for messages of a type of a first message 508A (e.g., for a first phase of the operations), a second queue 520B for messages of a type of a second message 508B, and the unprocessed work queue 522. In some embodiments, such as embodiments where the set of queues 510 is a queue service, the set of queue may be configured to automatically recirculate a message in its respective queue if, after a certain amount of time, the message was not acknowledged by the recipient as having been delivered. If the message is acknowledged by a recipient as having been delivered, the message may be deleted from its respective queue. In these embodiments, the recipient (e.g., host) may postpone acknowledgement of delivery of the message until processing on the data object referred to in the message has been successfully processed in the corresponding phase of operation. In this way, if the processing was not successful, the message will be automatically re-circulated in the queue and made available to a different host for re-processing. In alternative embodiments, the set of queues 510 may not be configured to automatically recirculate the message, and the recipient may instead push the message back to the queue if processing was unsuccessful.

In either case, in some examples, a "unprocessed work queue" may refer to a collection (e.g., a queue or repository) of messages that have not been indicated as having been successfully delivered. An example of an unprocessed work queue may be a dead letter queue of a queue service. In some embodiments, the unprocessed work queue 522 is a separate queue, and the set of queues 510 may be configured to automatically re-route messages to the unprocessed work queue 522 after the message has been in its respective queue (e.g., the first queue 520A or the second queue 520B) for a threshold amount of time or after a threshold number of delivery attempts. However, it is contemplated that in some embodiments the functionality described in conjunction with the unprocessed work queue 522 may be performed using a normal message queue, or by tagging a message as "dead" (e.g., such as appending the message with a flag value) within its own queue. It is also contemplated that the unprocessed work queue 522 may be any data structure sufficient for storing messages of the type described in the present disclosure, including a queue of a queue service, entries in a database table, an array, a circular buffer, a linked list, a stack, or similar data structure. The first message 508A may be a reference to a data object stored in a data store, such as a data store of a data storage service, pushed to the first queue 520A of the set of queues 510 by a migrator, similar to the first message 208A. Likewise, the second message 508B may be a message pushed to the second queue 520B of the set of queues 510 by a second host, similar to the second message 208B. As noted, the quantity and type of queues, and the format and origin of the first and second messages 508A-08B may vary depending on the implementation.

In an illustrative example demonstrating how a message may end up in the unprocessed work queue, a first host generates a bad checksum for a transformed data object and appends it to the first message 508A and pushes it to the second queue 520B as the second message 508B. Thereafter, the second message 508B is delivered to a second host, which performs the transformation on the corresponding data object as described in the present disclosure. However, because the checksum generated by the first host is bad, the transformation of the data object of the second host will result in a transformed data object that cannot be verified using the checksum, for example generated by the storage as a part of the storage process. Consequently, the second host will not cause the second message to be deleted from its respective queue, and the second message 508B will remain in the queue to be delivered to a different second host. However, because the checksum generated by the first host and in the second message 508B is bad, the transformation of the data object by any second host will result in a transformed data object that cannot be verified using the checksum. After a certain amount of time or after a threshold number of delivery attempts, the second message 508B may be determined to be "dead" and the second message 508B may be caused to be moved into the unprocessed work queue 522.

In this scenario, because the second message 508B may include the host ID of the first host that generated the checksum, the presence of an unusually high number of the second messages 508B in the unprocessed work queue 522 may suggest that the first host associated with the host ID has a problem. In some embodiments, the hosts of the fleet are configured to regulate themselves, such as by checking an unprocessed work queue upon occurrence of a trigger (e.g., after every hundred transformation or checksum generation operations, once a minute, when a processor temperature exceeds a threshold, etc.). For example, a host may periodically request a message from (i.e., audit) the unprocessed work queue 522 and check to see whether a host ID in the message matches their host ID. In other embodiments, the environment 500 may include a management component that can check the unprocessed work queue 522 and/or regulate the hosts, instead of the hosts regulating themselves. If a host matches a host ID above a certain frequency (e.g., once every hundred reads of the unprocessed work queue), the host or the management component may perform any of a variety of mitigation actions, such as removing itself from the fleet, rebooting itself, throttling itself to perform fewer transactions, or notifying a system administrator that the host may have a problem. In some embodiments where the host is a virtual machine, the host or the management component may take an action that causes virtual machine instance of the host to be terminated and re-instantiated/re-launched. In some embodiments, the certain frequency is based on threshold (e.g., the host or the management component counts more than a threshold of ten messages in the unprocessed work queue 522 associated with the host's host ID). In other embodiments, the certain frequency is proportional to other hosts (for example, if the host counts that it has 50% more messages in the unprocessed work queue 522 than the average of the other hosts).

In another scenario, the first host generates a good checksum for a transformed data object and appends it to the first message 508A and pushes it to the second queue 520B as the second message 508B. Thereafter, the second message 508B is delivered to a second host, which performs the transformation on the corresponding data object as described in the present disclosure. However, in this scenario, the second host has an error and the resulting transformation is bad. Consequently, the bad transformed data will be unable to be verified using the good checksum, and the second message 508B will remain in the queue to be delivered to a different second host. In many cases, the next second host will successfully transform the data object and it will be able to be verified with the good checksum. However in some cases, the next second host may also incorrectly transform the data object, meaning that the second message 508B remains in the second queue 520B. If this scenario repeats a threshold number of times or after a certain amount of time, this second message 508B too may be deemed dead, the second message 508B may be caused to be moved into the unprocessed work queue 522. This could indicate that the data object itself has a problem, since multiple hosts could not correctly transform it.

There may also be scenarios where the first message 508A may not be removed from the first queue 520A; for example, the data object associated with the first message 508A may be corrupt at the data store or may be continually corrupted during transmission from the data store to the first host, and consequently attempts to transform the data object results in an error. In such a scenario, the first message 508A may remain in the first queue 520A, and, after a certain time or after a threshold number of retries, the first message 508A may be deemed dead and moved to the unprocessed work queue 522.

Eventually, when the migrator has pushed all the first messages 508A from its manifests for transformation and/or migration and after all of the first and second messages 508A-08B are processed and/or otherwise emptied from the first and second queues 520A-20B, contents of the unprocessed work queue 522 should reflect the data objects remaining to be transformed and/or migrated. Thus, when the first queue 520A and the second queue 520B are empty, a process, such as the migrator, may retrieve all of the messages from the unprocessed work queue 522. The retrieved messages may indicate that corresponding data objects were not successfully transformed, verified, and stored with the data service, and, based on these messages, the migrator may generate a new batch of first messages 508A for the first queue 520 to restart the transformation and migration process for the data objects that were not successfully transformed and migrated in the first pass. These operations may repeat for as long as needed to get all data objects successfully transformed and migrated, or until the same data objects appear in the unprocessed work queue 522 after each pass of processing, which may indicate that the data object itself is corrupt at the data store or otherwise incompatible with the transformation being performed.

As illustrated in FIG. 4, the multiple queues 320A-20B described in conjunction with FIG. 3 may be implemented as a single queue. In a similar manner, in some embodiments, the functionality of the unprocessed work queue 522 is implemented in the single queue 20 of FIG. 4 or may be implemented in one of the queues 320A-20B of FIG. 3. For example, a message that has been in the second queue 320B or the single queue 420 beyond a threshold amount of time, or, after a threshold number of retries, has not been indicated as having been successfully delivered and processed, may be considered dead. The dead message in the second queue 320B or the single queue 420 may be processed in a similar manner to the dead messages in the unprocessed work queue 522 described above. In some of these non-exclusive unprocessed work queue embodiments, rather than the queue being audited for dead messages periodically or according to a trigger (such as may be configured to occur with the unprocessed work queue 522), a host may be configured to regulate itself by tracking the number of times it retrieves a message having its own host ID that it has retrieved before. If a count of the number of repeat messages with its own host ID exceeds a threshold, or is greater than a proportion (e.g., above a certain proportion of an average of similar counts by other hosts in the fleet), the host may perform a mitigation actions. As noted, such mitigation action could include the host removing itself from the fleet, rebooting itself, throttling itself to perform fewer transactions, notifying a system administrator that the host may have a problem, or, if the host is a virtual machine, cause its virtual machine instance to be terminated. Additionally or alternatively, in some implementations, when the second host 418B retrieves the second message 408B, it appends its own host ID as a second host ID and/or may update and append a counter to the second message 418B and push the appended second message to the single queue 420 (also notifying the single queue 420 to delete the unappended second message 418B). In this manner, a host that retrieves a message that includes its host ID as a first host ID can determine the identity of other hosts that have attempted to process the message and/or the number of times processing of the message has been attempted.

This may allow the first host 418A to determine whether the error detection codes it generated and included in the second message 408B were in error, and perform a mitigation action. Additionally, the second host ID may allow determination of whether the second host 418B may be incorrectly transforming the data object. For example, several appended second messages in the single queue 420 or the unprocessed work queue 522 having host IDs of a particular second host may be an indication of a problem with that second host.

The first queue 520A and the second queue 520B may be separate messaging queues of a messaging service, such as a queue service. The set of queues 510 may be a collection of computing resources configured to store and deliver one or more messages in queues, such as the first queue 520A, the second queue 520B, and the unprocessed work queue 522, similar to the set of queues 210 described in conjunction with FIG. 2. Each message provided to the set of queues 510 may comprise any variation of text, such as programming code, URIs for data objects and other statements. The unprocessed work queue 522 may be a message queue of the set of queues 510 configured to receive and hold messages that have languished in either the first queue 520A or the second queue 520B without being successfully delivered/ processed by a host. The messages in the unprocessed work queue 522 may be usable to identify particular hosts that are experiencing or producing an unusually high number of errors during the transformation and migration operations.

For example, if a message retrieved from the unprocessed work queue 522 includes a host ID (i.e., a message 508D) and a set of error detection codes, it may be determined that transformed data associated with the set of error detection codes could not be successfully validated using the set of error detection codes. Based at least in part on this information, it may be determined that the data object associated with the storage location in the message has yet to be migrated and should be rescheduled for migration. Furthermore, the presence of the message in the unprocessed work queue 522 may indicate that there is an error with the set of error detection codes, which, in turn, may indicate a problem with the host that generated the set of error detection codes (i.e., the host associated with the host ID). In some cases, a small number of messages associated with any given host ID may be expected to appear in the unprocessed work queue 522. However, determination that a host associated with a host ID in a message in the unprocessed work queue 522 may have a problem may be made when a quantity of messages in the unprocessed work queue 522 associated with the same host ID exceeds a threshold (e.g., 1,000 messages).

A mitigation action may be performed upon determination that a host associated with a host ID has a problem. For example, the host may be stopped/dropped from the fleet of hosts performing transformation and migration on the data objects. In cases where the host is a virtual machine instance, the virtual machine instance may be terminated and re-instantiated. In cases where a number of virtual machines all running on the same physical computing system appear to be recurrently appearing in as hosts in the unprocessed work queue 522, the associated physical computing system may be taken offline (e.g., for diagnostics and repair). New messages (e.g., the first message 508A) may be generated for each second message 508B in the unprocessed work queue 522 and pushed to the first queue 520A for another try at transforming and migrating the associated data object.

As another example, if a message retrieved from the unprocessed work queue 522 does not include a host ID and a set of error detection codes, it may be determined that set of error detection codes was never properly generated for the data object associated with the storage location in the message, and consequently the data object has not yet been transformed and migrated. In such a case, the storage location associated with the particular data object may be logged for later analysis to determine why the transformation and migration process for the data object did not successfully complete the first phase operations.

In some cases, an error log may be utilized in addition to or alternative to the unprocessed work queue 522. For example, in a case where a host ID is not included in a message in the unprocessed work queue 522 (such as may occur if the message came from the first queue 520A), a host or other system may check whether any errors associated with the data object indicated in the message have been logged, and whether any identifying information about the host was also included. For example, in a case where a hardware error is corrupting data objects being provided to some hosts performing first phase operations (i.e., first hosts), an error log may be read to determine the identities of the requesting first hosts. A similar example may be where transformed data is being corrupted during the transmission from second hosts to a destination data store, and an error log may be accessed to determine identities of the sending hosts.

Figure 6:
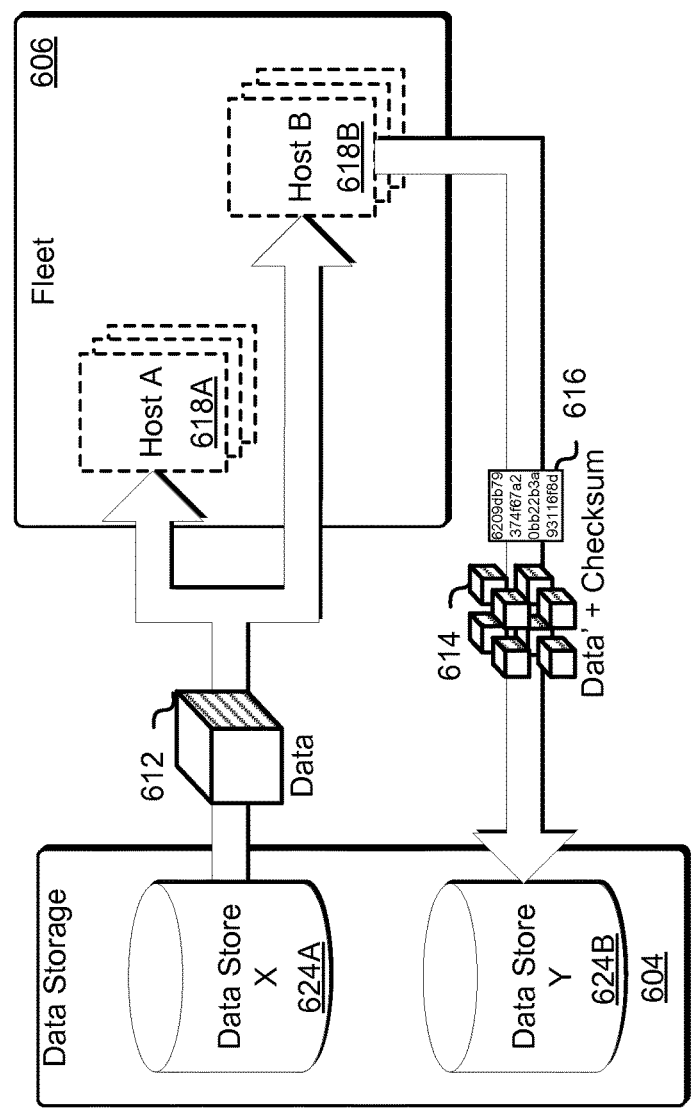
FIG. 6 illustrates an example of transformation and migration from a first data store to a second data store in accordance with an embodiment.

FIG. 6 illustrates an aspect of an environment 600 in which an embodiment may be practiced. Specifically, FIG. 6 depicts a first host 618A that obtains a data object 612 from a first data store 624A of data storage 604 and performs one or more operations in a first phase, such as generating a set of error detection codes 616 (e.g., set of checksums) for a transformation of the data object. In a second phase, a second host 618B receives the data object 612 from the first data store 624A as well, and performs a transformation on the data object 612 to produce transformed data 614. The second host 618B may then provide the transformed data 614 and data produced by the first host 618A (e.g., the set of checksums) to the data storage 604 for storage in a second data store 624B. Note that although the set of error detection codes 616 is depicted as being provided to the data storage 604 by the second host 618B, it is contemplated that, in other embodiments, the set of error detection codes 616 may be obtained by the data storage 604 from the first host 618A, a message queue, or from some other source different than the second host 618B.

The fleet of hosts 606 may be a collection of physical or virtual computing resources configured to transform and migrate data objects, similar to the fleet of hosts 206 described in conjunction with FIG. 2. The hosts 618A-18B of the fleet of hosts 606 may be one or more virtual machine instances executing on physical hosts, similar to the hosts 318A-18B described in conjunction with FIG. 3. The data object 612 may be at least one data object of a set of data objects to be transformed and migrated, similar to the data object 212 described in conjunction with FIG. 2, and the transformed data 614 may be a set of one or more data objects, similar to the transformed data 214, produced by transforming the data object 612, which, as noted, may itself be a set of one or more data objects. The set of error detection codes 616 may be a cyclic redundancy check, hash value, or other checksum or verification information, similar to the set of error detection codes 216, for verifying the integrity of the transformed data 614. For example, the set of error detection codes 616 may be produced by passing the transformed data 614 through a MD5, SHA1, or SHA-256 cryptographic hash function. The data storage 604 may be a collection of computing resources provided by a computing resource service provider configured to synchronously process requests to store and/or access data, similar to the data storage 204 described in conjunction with FIG. 2.

The first data store 624A may be a database, file system, or other storage device/repository or component suitable for storing sets of data objects, such as the data object 612. Likewise, the second data store 624B may be a database, file system, or other storage device/repository or component suitable for storing sets of data objects, such as the transformed data 614. The data stores 624A-24B may be provided by the data storage 604 of a computing resource service provider, or may actually be hosted at different data storages and/or with different computing resource service providers.

Figure 7:
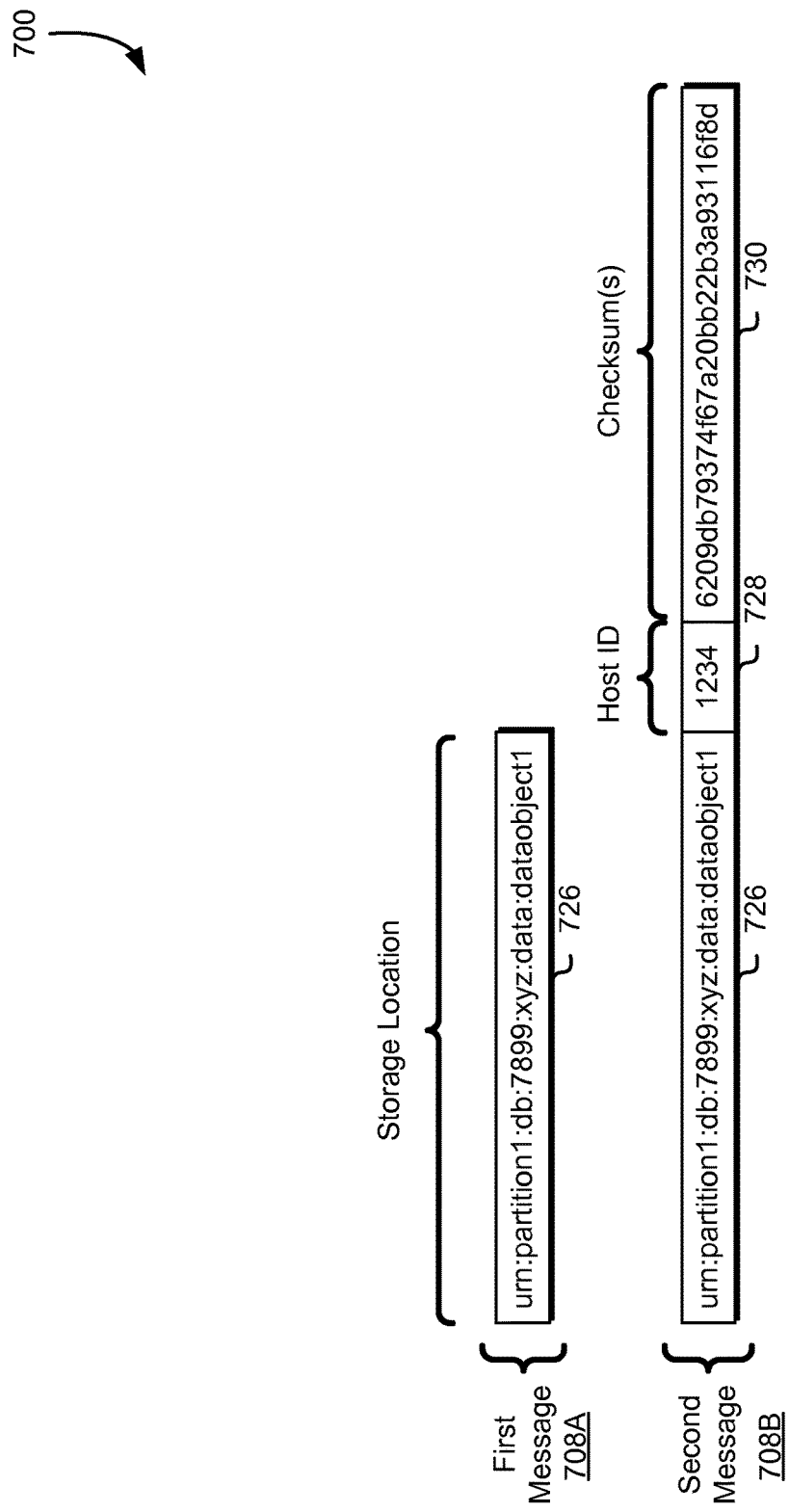
FIG. 7 illustrates an example of a first and second message in accordance with an embodiment.

FIG. 7 illustrates an example 700 of messages that may be provided to queues of embodiments of the present disclosure. First message 708A is an example of a message that might be provided to a queue of a queue service by a migrator, like the migrator 202 of FIG. 2, for delivery to a first host, similar to the first message 208A described in conjunction with FIG. 2. As shown, at least a portion of the data may include a storage location 726 where a data object being transformed and migrated may be located. The storage location 726 may be represented in any format suitable for uniquely locating the data object in a computing environment, such as by using a URI to identify the resource. Thus, the storage location 726 is shown to include the data object path and the data object name for locating the data object.

Second message 708B may be a message that might be provided to a queue of a queue service by the first host, for delivery to a second host, similar to the second message 208B described in conjunction with FIG. 2. As shown, the second message 708B may include at least a portion of the first message 708A, such as the storage location 726, as well as a set of one or more error detection codes 730, and a host ID 728 of the first host that generated the set of one or more error detection codes 730. Note that the first message 708A and the second message 708B depicted in FIG. 7 are for illustration purposes only. For example, in some implementations, a host ID will not be present. In other implementations, for example in implementations where a data object is split into multiple data objects, the second message 708B could be multiple messages (i.e., a separate message for each of the multiple data objects). Alternatively, in implementations where a data object is split into multiple data objects, the set of one or more error detection codes 730 may comprise error codes corresponding to each of the multiple data objects appended to the second message 708B.

Figure 8:
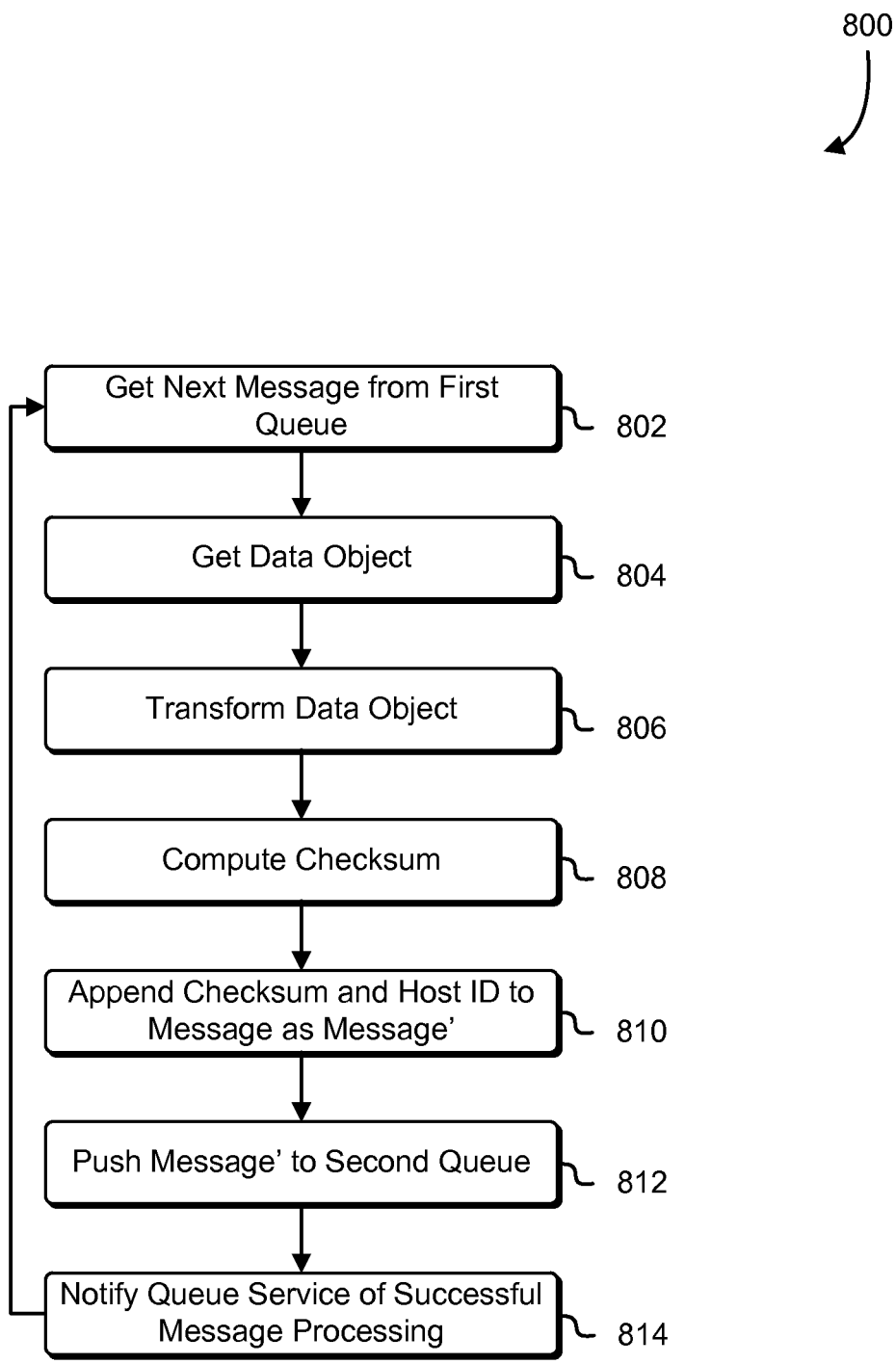
FIG. 8 is a block diagram that illustrates an example of a first phase of transformation and migration operations in accordance with an embodiment.

FIG. 8 is a block diagram illustrating an example of a process 800 for a first phase of transformation and migration operations in accordance with various embodiments. The process 800 may be performed by any suitable system such as a web server 1206 or application server 1208 of FIG. 12, multiple computing devices in a distributed system of a computing resource service provider, or any electronic client device such as the electronic client device 1202 described in conjunction with FIG. 12. The process 800 includes a series of operations wherein a message indicating a storage location of a data object is obtained from a first queue, the data object is obtained and processed, a set of error detection codes is generated, and a second message containing the set of error detection codes is pushed to a second queue in preparation for a second phase of transformation and migration operations.

In 802, a message is obtained from a first queue. In some implementations, when the message is read from the queue, it is not automatically removed from the queue; for example, the message may be returned to the end of the queue. In such implementations, the system performing the process 800 may have to perform some action to cause the message to be removed from the queue, such as by notifying a queue service that the message delivered with a specified message ID has been successfully received and processed. In other implementations, the message is automatically be removed from the queue when it is read.

As noted, the first queue may be any type of structure sufficient for storing messages of the type described in the present disclosure, including a queue of a queue service, entries in a database table, an array, a circular buffer, a linked list, a stack, or similar data structure. The message may include a storage location for a data object to be transformed and/or migrated, and thus, in 804, the system performing the process 800 may obtain the data object from the storage location specified in the message. Note that alternative messages and ways of obtaining the data object are also contemplated; for example, the message from the first queue may, rather than a storage location, include a data object identifier (object ID). In such a case, the system performing the process 800 may obtain the data object by making a request, such as through an application programming interface of a data storage service, and passing the object ID with the request. In embodiments, the system performing the process 800 may provide proof of possession of credentials sufficient to authorize the system performing the process 800 to receive the data object. As noted, the data object in some cases may be a set of data objects.

Having received the data object, in 806, the system performing the process 800 may perform a transformation on the received data object according to a transformation scheme. Examples of transformation schemes include, but are not limited to one or more of, encrypting/decrypting the data object, splitting/joining the data object, adding headers or footers to the data object, compressing/decompressing the data object, or embedding/extracting data into/from the data object. In 808, the system performing the process 800 may compute at least one checksum, or other set of error detection codes, suitable for validating the transformed data object.

In 810, the system performing the process may generate another message. This other message may at least include the at least one checksum, or other set of error detection codes, generated in 808, and may additionally include the storage location read from the message obtained in 802 and/or a host ID for the system performing the process 800. In 812, the system performing the process 800 may push the other message into a queue. In some embodiments the queue is a second queue of the same or different type as the first queue of 802. In other embodiments, the queue of 812 is the same queue as the first queue.

Upon successfully pushing the other message to its queue of 812, in 814, the system performing the process 800 may notify a queue service that the message obtained in 802 was successfully processed, or, if the queue of 802 was not a queue of a queue service, otherwise cause the message of 802 to be removed or otherwise flagged as having been successfully processed. Then, the system performing the process 800 may return to 802 to obtain the next message in the first queue and repeat the operations of 804-14. Note that one or more of the operations performed in 802-14 may be performed in various orders and combinations, including in parallel.

Figure 9:
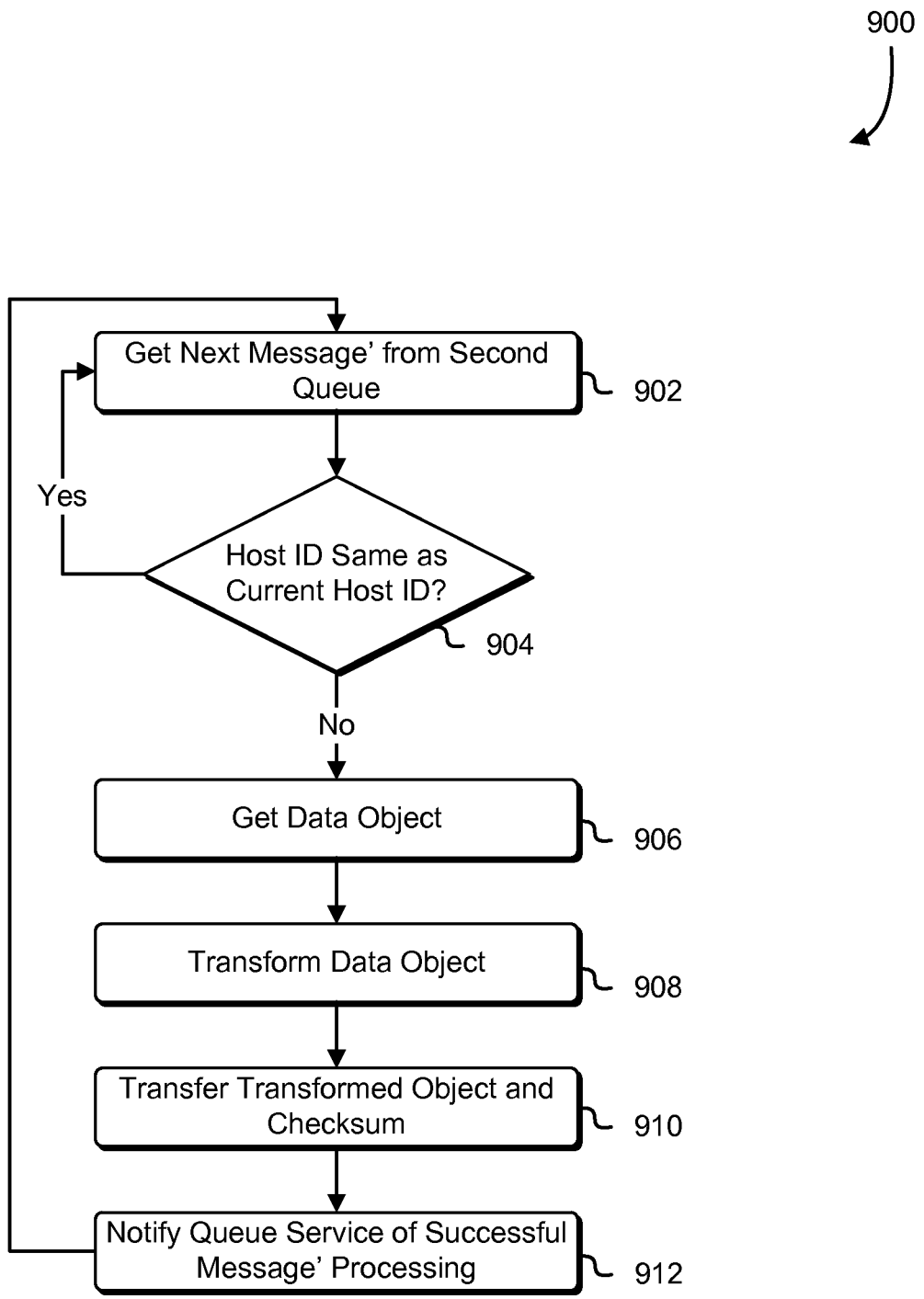
FIG. 9 is a flow chart that illustrates an example of a second phase of transformation and migration operations in accordance with an embodiment.

FIG. 9 is a flow chart illustrating an example of a process 900 for a second phase of transformation and migration operations in accordance with various embodiments. The process 900 may be performed by any suitable system such as a web server 1206 or application server 1208 of FIG. 12, multiple computing devices in a distributed system of a computing resource service provider, or any electronic client device such as the electronic client device 1202 described in conjunction with FIG. 12. The process 900 includes a series of operations wherein a message indicating a storage location of a data object and a set of error detection codes is obtained from a queue, the data object is obtained and processed, and the processed data object and the set of error detection codes is provided to a data store.

In 902, a message is obtained from a queue. In some implementations, when the message is read from the queue, it is not automatically removed from the queue; for example, the message may be returned to the end of the queue. In such implementations, the system performing the process 900 may have to perform some action to cause the message to be removed from the queue, such as by notifying a queue service that the message delivered with a specified message ID has been successfully received and processed. In other implementations, the message is automatically be removed from the queue when it is read.

As noted, the queue may be any type of structure sufficient for storing messages of the type described in the present disclosure, including a queue of a queue service, entries in a database table, an array, a circular buffer, a linked list, a stack, or similar data structure. The message may include a storage location for a data object to be transformed and/or migrated, a set of error detection codes, and, in some cases, a host ID for the host that generated the set of error detection codes.

In 904, the system performing the process 900 may determine whether the system is the same system that generated the set of error detection codes, such as by confirming that the host ID in the message does not match the host ID of the system. If the system performing the process 900 is the same system that generated the set of error detection codes in the message, the system may ignore the message and return to 902 to obtain the next message in the queue. In some implementations, the message service, not having been notified that the message was successfully processed, may automatically put the message back in the queue (e.g., at the end). In some of these implementations, a queue service may "hide" the delivered message for a period of time, and, after not having been notified that the message was successfully processed, may automatically put the message back in the queue. In this manner, the queue service may reduce the chance of multiple hosts attempting to process the same message at the same time. In implementations where a queue service does not automatically put the message back into the queue if not notified that the message has been successfully processed, upon determining that the system performing the process 900 is the same system that generated the set of error detection codes in the message, the system may need to push the message back to the queue of the queue service before returning to 902 to obtain the next message. Note that in some embodiments, the system performing the process 900 may be a member of a different fleet than generates sets of error detection codes, and, in such embodiments, the operation of 904 may be omitted. In 906, the system performing the process 900 may obtain the data object from the storage location specified in the message. Note that alternative messages and ways of obtaining the data object are also contemplated; for example, the message from the queue may, rather than a storage location, include a data object identifier (object ID). In such a case, the system performing the process 900 may obtain the data object by making a request, such as through an application programming interface of a data storage service, and passing the object ID with the request. In embodiments, the system performing the process 900 may provide proof of possession of credentials sufficient to authorize the system 900 to receive the data object. As noted, the data object in some cases may be a set of data objects.

Having received the data object, in 908, the system performing the process 900 may perform a transformation on the received data object in the same manner as was performed on the data object in 806 of the first phase of operations of FIG. 8. In 910, the system performing the process 900 may provide the transformed data object and the set of error detection codes (e.g., set of checksums) to an appropriate resource or data storage service for storage. In embodiments, the system performing the process 900 provides proof of possession of credentials sufficient to authorize the system performing the process 900 to store the transformed data object. As noted, the transformed data object in some cases may be a set of transformed data objects.

Upon receiving notification from the appropriate resource or data storage service that the transformed data object was successfully validated against the error correction code, in 912, the system performing the process 900 may notify a queue service that the message obtained in 902 was successfully processed, or, if the queue of 902 was not a queue of a queue service, otherwise cause the message of 902 to be removed or otherwise flagged as having been successfully processed. Then, the system performing the process 900 may return to 902 to obtain the next message in the queue and repeat the operations of 904-12. Note that one or more of the operations performed in 902-12 may be performed in various orders and combinations, including in parallel.

Figure 10:
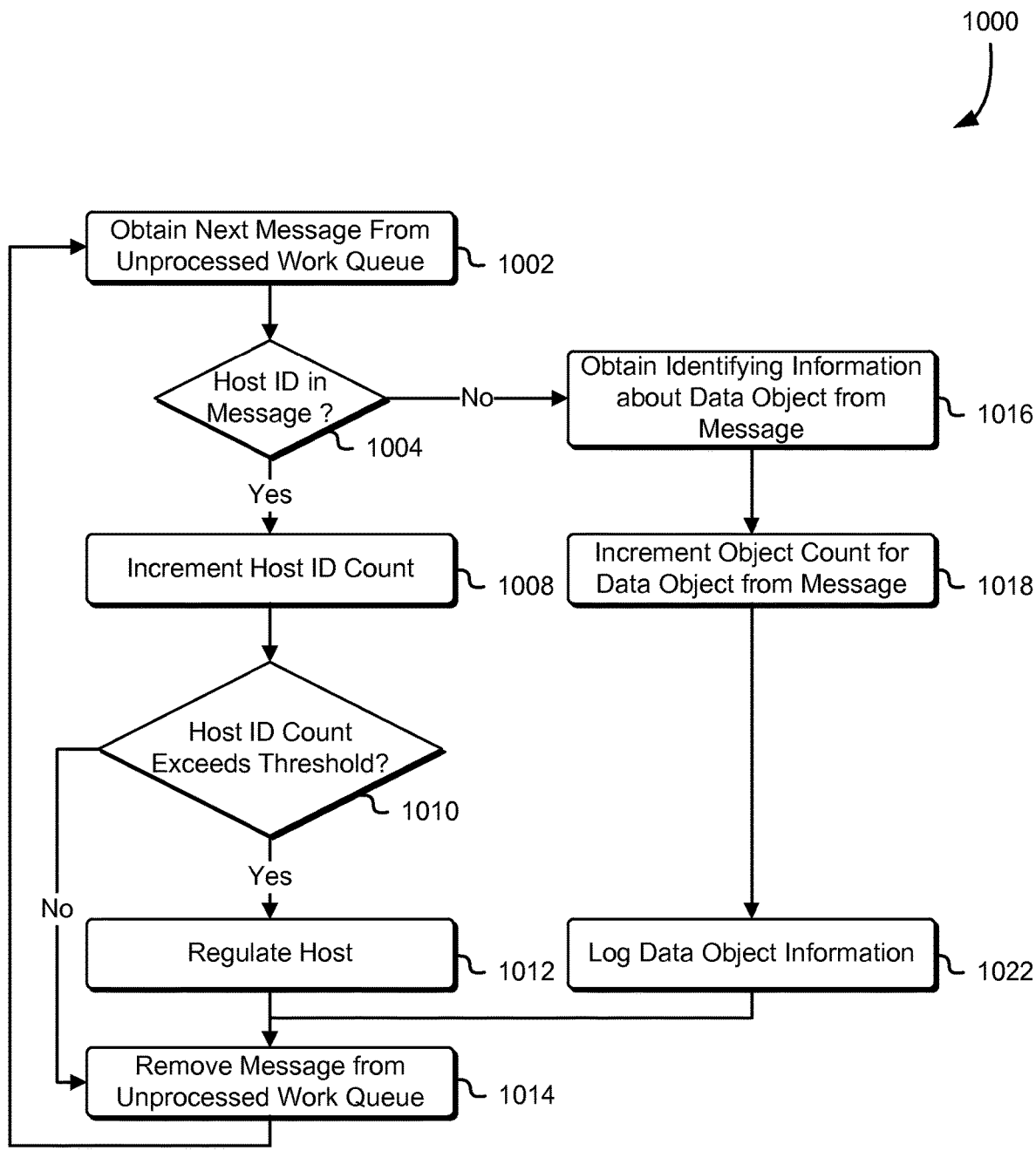
FIG. 10 is a flow chart that illustrates an example of processing messages in an unprocessed work queue in accordance with an embodiment.

FIG. 10 is a flow chart illustrating an example of a process 1000 for fleet management using an unprocessed work queue, such as a dead letter queue, in accordance with various embodiments. The process 1000 may be performed by any suitable system such as a web server 1206 or application server 1208 of FIG. 12, multiple computing devices in a distributed system of a computing resource service provider, or any electronic client device such as the electronic client device 1202 described in conjunction with FIG. 12. The process 1000 includes a series of operations wherein messages are read from the unprocessed work queue, and messages associated with included host IDs counted and, if they exceed a threshold or proportion to the other hosts, an action may be taken to regulate the host associated with the host ID.

As noted, the unprocessed work queue may be a queue of a queue service where stale messages (i.e., messages that have aged beyond an expiration date/period or messages that, after a threshold number of deliveries, are still in the queue) may be routed by the queueing service. In 1002, the system performing the process 1000 retrieves a message from the unprocessed work queue. The unprocessed work queue may contain messages originating from any of a variety of queues in the queue service. For example, stale messages from the first queue 320A of FIG. 3 may end up in the unprocessed work queue as well as stale messages from the second queue 320B. Thus, in some cases the message obtained in 1002 will include a host ID, and, in other cases, the message will not.

Consequently, in 1004, the system performing the process 1000 may determine whether the message includes a host ID. If the message does not include a host ID, the system performing the process 1000 may proceed to 1016, whereupon information useful for identifying the data object associated with the message, such as the data object location or object ID, may be obtained from the message. Then, in 1018, a count associated with that data object may be incremented. In this manner, it may be possible to track a data object that, for reasons that may be unrelated to a host, may be proving difficult to transform or migrate (for example, the data object may be corrupted at the original storage location, which may cause an attempt to transform the data object to terminate prematurely). In 1022, the message and/or other information about the associated data object (e.g., object ID, storage location, size, date/time last modified, etc.) may be logged for later analysis and/or retry by a migrator like the migrator 202 of FIG. 2 or by system administrators. In some implementations, a determination will be made whether the object count of 1018 exceeds a threshold and only log the object information if the threshold is exceeded, similar to the operations of 1010-12 for the host. In such cases, the object count threshold may be lower or higher than the host count threshold, whereas in other implementations information about the data object will be logged each time an associated message without a host ID appears in the unprocessed work queue.

Otherwise, if the message includes a host ID, the system performing the process 1000 may proceed to 1008, whereupon a count associated with the host ID may be incremented to indicate the occurrence of the message in the unprocessed work queue associated with the particular host. It may be expected to see a few messages in the unprocessed work queue for various reasons; however, if a particular host ID appears with unexpected frequency in the unprocessed work queue, it may be an indication that there is a problem associated with the host of that host ID. In some examples, "unexpected frequency" may refer to a number of occurrences of a particular host ID exceeding a threshold (e.g., fifteen, two in a row, five in the past hour, etc.). In other examples, unexpected frequency may refer to one or more occurrences of a particular host ID being disproportionate (e.g., 50% more) to other (e.g. an average of) other host IDs in the fleet.

Thus, in 1010, the system performing the process 1000 may determine whether the particular host ID has occurred with unexpected frequency. If not, the system performing the process 1000 may proceed to 1014, whereupon the message may be logged for later analysis and/or retry by a migrator like the migrator 2020 of FIG. 2 or by system administrators, and the message may be removed from the queue so that it is not counted again. The system performing the process 1000 may then return to 1002 to obtain the next message from the unprocessed work queue and repeat the operations of 1002-14. The process 1000 may repeat until all messages in the unprocessed work queue have been processed.

Otherwise, if the particular host ID is determined to have occurred with unexpected frequency, the system performing the process 1000 may perform some action to regulate the host associated with the host ID. In some embodiments, the system performing the process performs any of a variety of actions, including but not limited to, taking the host offline, dropping the host from the fleet, deleting and re-instantiating (i.e., terminating and re-launching) a virtual machine instance of the host, sending an alert message to a system administrator, or throttling the machine to reduce the load of the host and to reduce the impact of the host on the performance of the overall transformation and migration operations. In some embodiments, where a certain number of hosts of a fleet (in some of these embodiments, there may be multiple fleets of hosts) or sub-fleets exceed the same or different threshold, the entire fleet or sub-fleet may be terminated and re-launched as a mitigation action. Note that one or more of the operations performed in 1002-20 may be performed in various orders and combinations, including in parallel.

Figure 11:
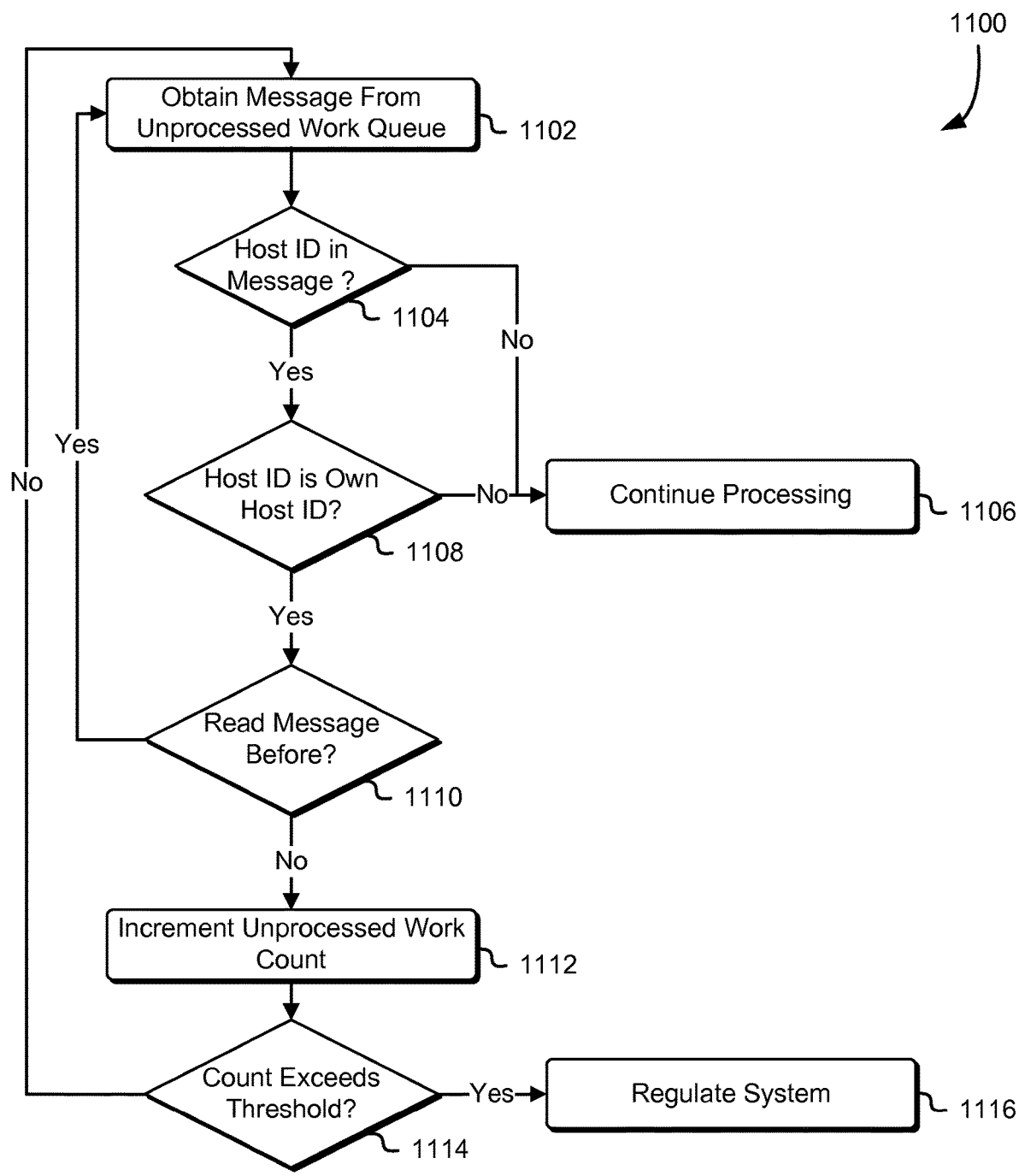
FIG. 11 is a flow chart that illustrates an example of regulating a host using an unprocessed work queue.

FIG. 11 is a flow chart illustrating an example of a process 1100 for a regulating a host utilizing an unprocessed work queue in accordance with various embodiments. The process 1100 may be performed by any suitable system such as any of the first hosts or second hosts described in the present disclosure. The process 1100 includes a series of operations wherein a host, at intervals, reads a message from the unprocessed work queue, determines if a host ID in the message corresponds to the reading host, and, if so, increments a counter. If the counter exceeds a threshold, the host may perform a regulation action.

As noted, the unprocessed work queue may be a queue of a queue service where stale messages (i.e., messages that have aged beyond an expiration date/period or messages that, after a threshold number of deliveries, are still in the queue) may be routed by the queueing service. In 1102, at an interval during performing first and/or second phase operations of the present disclosure, a host performing the process 1100 retrieves a message from the unprocessed work queue. As noted, the unprocessed work queue may contain messages originating from any of a variety of queues in the queue service.

In 1104, the host performing the process 1100 may determine whether the message includes a host ID. If the message does not include a host ID, the host performing the process 1100 may proceed to 1106, whereupon the host may continue performing the transformation and migration operations described in the present disclosure. In some embodiments, rather than proceeding to 1106 the host performing the process returns to 1102 to read the next message from the unprocessed work queue.

Otherwise, if the message has a host ID, the host performing the process 1108 may proceed to 1108 to determine whether the host ID in the message matches a host ID of the host performing the process 1100. If the host ID is not a match, then the host may proceed to 1106, whereupon the host may continue performing the transformation and migration operations described in the present disclosure. In some implementations, the host performing the process 1100 counts the number of occurrences of host IDs belonging to other hosts in order to determine the relative frequency that messages corresponding to the host ID of the host appear in the unprocessed work queue as compared with other hosts. In some implementations, the counts corresponding to each host are stored in a buffer, database, or other structure accessible to the host and the other hosts for making this relative comparison. Otherwise, if the host ID does match the host ID of the host performing the process 1100, the host performing the process 1100 may proceed to 1110, whereupon the host may determine whether the host has previously read the message. Because the host may only count new messages (e.g., messages it has not already counted), upon determining that the host has read the same message previously, the host may return to 1102 to read the next message in the queue.

Otherwise, if the host has not read the message with its host ID from the unprocessed work queue before, the host performing the process 1100 may proceed to 1112, whereupon it may increment a counter reflecting a count of messages having its host ID in the queue. In 1114, the host performing the process 1100 may determine whether the count exceeds a threshold indicating an unexpected frequency (e.g., fifteen, two in a row, five in the past hour, 20% more than other hosts, etc.). If the count does not exceed a threshold, the host performing the process 1100 may return to 1102 as, having identified its host ID in at least one message, it may be advantageous to determine whether the next message in the unprocessed work queue corresponds to the host's host ID as well. In this manner, defective hosts may be identified more quickly. However, in some implementations, the host performing the process 1100, instead, return to 1106 to continue processing transformation and migration operations.

Otherwise, if the count indicates an unexpected frequency of messages corresponding to the host in the unprocessed work queue, the host performing the process 1100 may proceed to 1116 whereupon it a mitigation action may be performed. In some embodiments the host may cause the mitigation action to be performed, and in other embodiments, the mitigation action may be caused to be performed by a host management component. As described in the present disclosure, a mitigation action may include actions such as dropping the host from the fleet or otherwise taking the host offline, throttling its rate of performing operations, notifying a system administrator, terminating and restarting its virtual machine instance. Note that in some implementations, after the mitigation action is performed, the host performing the process 1100 resets its unprocessed work message count to aid in determining whether the regulation action was successful in reducing the number of messages from the host being sent to the unprocessed work queue. Note that one or more of the operations performed in 1102-16 may be performed in various orders and combinations, including in parallel. Note, too, that unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 12:
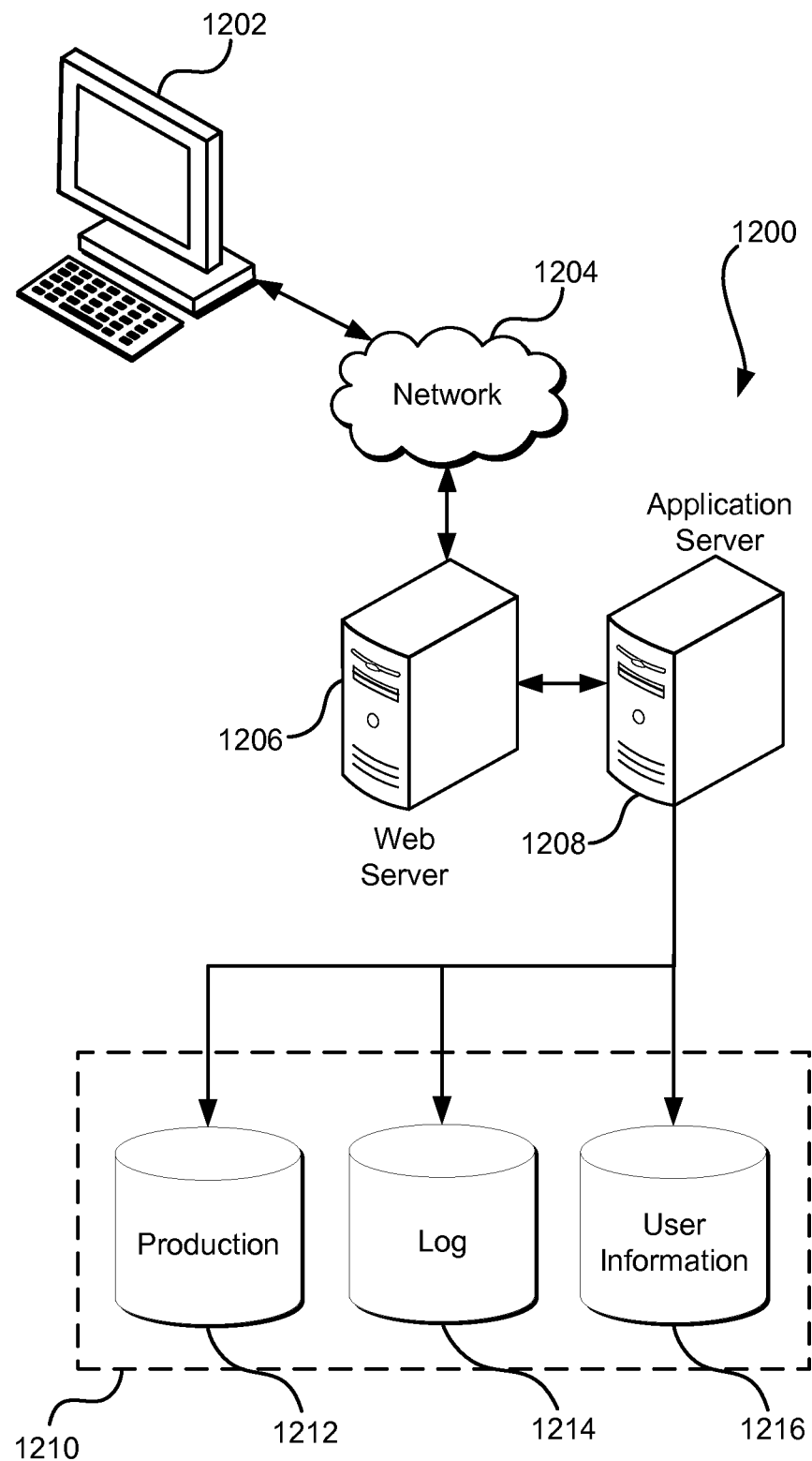
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1204 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1204 can be enabled by wired or wireless connections and combinations thereof. In this example, the network 1204 includes the Internet, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1208 can include any appropriate hardware, software and firmware for integrating with the data store 1210 as needed to execute aspects of one or more applications for the electronic client device 1202, handling some or all of the data access and business logic for an application. The application server 1208 may provide access control services in cooperation with the data store 1210 and is able to generate content including, text, graphics, audio, video and/or other content usable to be provided to the user, which may be served to the user by the web server 1206 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1202 to provide the content in one or more forms including, forms that are perceptible to the user audibly, visually and/or through other senses including touch, taste, and/or smell. The handling of all requests and responses, as well as the delivery of content between the electronic client device 1202 and the application server 1208, can be handled by the web server 1206 using PHP: Hypertext Preprocessor ("PHP"), Python, Ruby, Perl, Java, HTML, XML, or another appropriate server-side structured language in this example. It should be understood that the web server 1206 and application server 1208 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store 1210 may include mechanisms for storing production data 1212 and user information 1216, which can be used to serve content for the production side. The data store 1210 also is shown to include a mechanism for storing log data 1214, which can be used for reporting, analysis or other purposes. It should be understood that there can be many other aspects that may need to be stored in the data store 1210, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1208. In one example, a user, through a device operated by the user, might submit a search request for a certain type of item. In this case, the data store 1210 might access the user information 1216 to verify the identity of the user and can access the catalog detail information to obtain information about items of that type. The information then can be returned to the user, such as in a results listing on a web page that the user is able to view via a browser on the electronic client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the example environment 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1204 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 12. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be collectively stored on one or more computer-readable storage media, for example, in the form of computer programs comprising instructions executable by one or more processors of one or more hosts. One or more computer-readable storage media having collectively stored thereon executable instructions. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   obtaining, at a first host, a first message from a first message queue, the first message indicating a storage location of an untransformed data object, wherein the storage location is a first storage location of a data storage service of a computing resource service provider;
   generating, at the first host, a reference set of checksums corresponding to a transformation of the untransformed data object into one or more first transformed data objects according to a transformation scheme;
   generating, by the first host, a second message, the second message including: the first message, the reference set of checksums, and a host identifier of the first host;
   providing, by the first host, the second message to a second message queue;
   obtaining, at a second host, the second message from the second message queue;
   parsing, at the second host, the second message to determine the storage location of the untransformed data object indicated by the first message;
   obtaining, at the second host, the untransformed data object from the storage location;

determining, by the second host, whether the host identifier included in the second message is different from an identifier of the second host, as a result of the determination that the host identifier included in the second message is different from the identifier of the second host, transforming, at the second host, the untransformed data object into one or more second transformed data objects according to the transformation scheme;

sending, by the second host, the one or more second transformed data objects and the reference set of checksums obtained from the second message, to the data storage service;

generating, by the data storage service, a verification set of checksums for the one or more second transformed data objects;

verifying, by the data storage service, that the verification set of checksums for the one or more second transformed data objects match the reference set of checksums obtained from the second message; and as a result of the verifying, storing, by the data storage service, the one or more second transformed data objects at a second storage location of the data storage service different from the first storage location.

2. The computer-implemented method of claim 1, wherein the first host and the second host are members of a fleet of hosts, wherein each member of the fleet of hosts executes in parallel with other members of the fleet of hosts; and wherein the first host and the second host interchangeably perform either operations of the first host or operations of the second host.

3. The computer-implemented method of claim 1, further comprising:

providing, by the second host, the reference set of checksums obtained from the second message and the one or more second transformed data objects to a third host of the data storage service; and at the third host, performing the steps of:

generating the verification set of checksums for the one or more second transformed data objects;

verifying, by the third host, that the verification set of checksums for the one or more second transformed data objects match the reference set of checksums obtained from the second message; and storing, by the third host, the one or more second transformed data objects at a second storage location of the data storage service different from the first storage location.

4. A system, comprising:

one or more processors; and memory including instructions that, as a result of being executed by the one or more processors, cause the system to:

obtain, by a first host, a first message from a first message queue, wherein the first message comprises a first storage location of an untransformed data object, wherein the untransformed data object is stored in the first storage location of a data storage service of a computing resource service provider;

transform, by the first host, the untransformed data object into a first set of transformed data according to a transformation scheme;

generate, by the first host, a second message for a second message queue, wherein the second message comprises the first message and an error detection code associated with the first set of transformed data;

obtain, by a second host, the second message from the second message queue;

parse, by the second host, the second message to determine the first storage location of the untransformed data object indicated by the first message;

transform, by the second host, the untransformed data object into a second set of transformed data according to the transformation scheme;

verify, by the second host, the second set of transformed data based at least in part on the error detection code associated with the first set of transformed data, wherein the error detection code is obtained from the second message, and wherein the verification is performed based at least in part on a determination that a computer system that generated the second set of transformed data is different from a computer system that generated the error detection code; and as a result of the verification by the second host, cause the second set of transformed data to be stored in a second storage location different from the first storage location.

5. The system of claim 4, wherein the untransformed data object is a data object of a set of data objects in a data store that is selected for transformation, and the instructions further include instructions that cause the system to:

select the set of data objects to be transformed; and for each data object of the set of data objects, indicate, within the first message and the second message the storage location for the untransformed data object to be transformed.

6. The system of claim 4, wherein the memory is a virtual memory and the one or more processors and one or more virtual processors of virtual machine instances hosted by the computing resource service provider.

7. The system of claim 4, wherein:

the untransformed data object is a first data object and is transformed into the first set of transformed data by a first computer system at the first host; and the instructions further include instructions that cause the system to, based at least in part on a determination that the first computer system generated the error detection code:

obtain, by a third host, a second data object associated with a second error detection code generated by a second computer system of the second host different from the first computer system;

transform, by the third host, the second data object into the second set of transformed data; and cause, by the third host, the second set of transformed data to be verified against the second error detection code.

8. The system of claim 4, wherein the error detection code is a first error detection code and the instructions that verify the second set of transformed data include instructions that cause the system to:

generate, by the second host, a second error detection code associated with the second set of transformed data; and determine, by the second host, that the second error detection code matches the first error detection code.

9. The system of claim 7, wherein:

a second computer system of the second host, different from the first computer system, transforms the untransformed data object into the second set of transformed data.

10. The system of claim 4, wherein:
the first message and second message are delivered by a queue service.

11. The system of claim 10, wherein the instructions further include instructions that cause the system to provide the storage location for the untransformed data object and the error detection code to the queue service in a message.

12. The system of claim 10, wherein:
the queue service includes an unprocessed message repository, wherein messages remaining in the queue service beyond a threshold are moved to the unprocessed message repository; and
the instructions further include instructions that cause the system to:
based at least in part on successful generation of the error detection code, removing the first message from the queue service; and
based at least in part on successful storage of the second set of transformed data, removing the second message from the queue service.

13. The system of claim 10, wherein:
the first message is delivered to the system from the first message queue; and
the second message is delivered to the system from the second message queue.

14. The system of claim 10, wherein the first message queue delivering the first message and the second message queue delivering the second message to the system are from a same queue.

15. A non-transitory computer-readable storage medium having collectively stored thereon executable instructions that, as a result of being executed by one or more processors of a set of computer systems, cause the set of computer systems to at least:
obtain, by a first host, a first message from a set of messages, wherein the first message comprises a location of a first data store comprising an untransformed data object, wherein the first data store is hosted by a data storage service of a computing resource service provider;
obtain, by the first host, the untransformed data object from the first data store indicated by the first message;
generate, by the first host, a second message comprising at least the first message and error detection codes corresponding to a transformation of the untransformed data object into one or more transformed data objects according to a transformation scheme;
provide, by the first host, the second message to the set of messages;
obtain, by a second host, the untransformed data object associated with the error detection codes from the first data store based at least in part on information obtained in the second message;
transform, by the second host, the untransformed data object according to the transformation scheme into a data transformation;
verify, by the second host, the data transformation against the error detection codes corresponding to the transformation of the untransformed data object according to the transformation scheme, wherein the error detection code is obtained from the second message, and wherein the verification is performed based at least in part on a determination that a computer system that generated the data transformation is different from a computer system that generated the error detection codes; and
as a result of the verification by the second host, store the data transformation in a second data store different from the first data store.

16. The non-transitory computer-readable storage medium of claim 15, wherein the transformation scheme includes splitting the untransformed data object to produce a set of split data objects, compressing the untransformed data object to produce a compressed data object, combining the untransformed data object with another untransformed data object to produce a combined data object, or encrypting the untransformed data object to produce an encrypted data object.

17. The non-transitory computer-readable storage medium of claim 15, wherein:
the executable instructions that cause the first host to generate the error detection codes is performed by a first computer system of the first host; and
the executable instructions that cause the second host to transform the untransformed data object into the data transformation is performed by a second computer system of the second host, wherein the second computer system is different from the first computer system.

18. The non-transitory computer-readable storage medium of claim 17, wherein:
the executable instructions that cause the second host to obtain the error detection codes include instructions that cause the second host to obtain the error detection codes from the second message from the set of messages; and
the instructions that cause the second host to transform the untransformed data object into the data transformation to be performed by the second computer system different from the first computer system further include instructions that cause the second computer system to determine that a host identifier included in the second message with the error detection codes does not match a host identifier of the second computer system.

19. The non-transitory computer-readable storage medium of claim 15, wherein the second message further includes at least the storage location of the untransformed data object at the first data store and a host identifier.

20. The non-transitory computer-readable storage medium of claim 15, wherein:
the set of messages includes a first set of messages and a second set of messages;
the first message is obtained from the first set of messages; and
the instructions that generate the error detection codes further include instructions that cause the first host to push the second message to the second set of messages.

21. The non-transitory computer-readable storage medium of claim 15, wherein the set of messages is a single set of messages for holding both the first message and the second message.

* * * * *